(12) United States Patent
Luo et al.

(10) Patent No.: US 12,314,082 B2
(45) Date of Patent: May 27, 2025

(54) FOLDABLE TERMINAL DEVICE INCLUDING AT LEAST THREE HOUSINGS COUPLED BY ROTATING SHAFTS

(71) Applicant: Huawei Technologies Co., Ltd., Shenzhen (CN)

(72) Inventors: Junchao Luo, Shenzhen (CN); Hongfan Lin, Shanghai (CN); Jiafeng Ding, Shanghai (CN); Hanbiao Jin, Shanghai (CN); Guanghai Huang, Dongguan (CN); Wei Shan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/804,458

(22) Filed: May 27, 2022

(65) Prior Publication Data

US 2022/0291720 A1 Sep. 15, 2022

Related U.S. Application Data

(63) Continuation of application No. PCT/CN2020/124521, filed on Oct. 28, 2020.

(30) Foreign Application Priority Data

Nov. 28, 2019 (CN) .......................... 201911190782.9

(51) Int. Cl.
*G06F 1/16* (2006.01)
(52) U.S. Cl.
CPC .......... *G06F 1/1652* (2013.01); *G06F 1/1679* (2013.01); *G06F 1/1683* (2013.01)

(58) Field of Classification Search
None
See application file for complete search history.

(56) References Cited

U.S. PATENT DOCUMENTS

| 5,581,440 A | * | 12/1996 | Toedter | ................. G06F 1/1683 |
| | | | | 174/136 |
| 10,234,899 B1 | * | 3/2019 | Brocklesby | ........... G06F 1/1616 |

(Continued)

FOREIGN PATENT DOCUMENTS

| CN | 104796504 A | 7/2015 |
| CN | 104853009 | 8/2015 |

(Continued)

*Primary Examiner* — Amr A Awad
*Assistant Examiner* — Donna V Bocar
(74) *Attorney, Agent, or Firm* — Slater Matsil, LLP

(57) ABSTRACT

A foldable terminal device is provided, including a first housing, a second housing, a third housing, a wire, and a wire fastening assembly. The third housing is located between the first housing and the second housing, the wire penetrates through an interior of the third housing, and both ends of the wire are respectively connected to the first housing and the second housing. The wire fastening assembly is disposed inside the third housing, and is configured to fasten the wire of the foldable terminal device to the third housing. The wire fastening assembly includes a first magnetic component and a magnetic assembly, the first magnetic component is fixedly connected to the interior of the third housing, the magnetic assembly is connected to the wire, and the magnetic assembly is magnetically connected to the first magnetic component.

9 Claims, 11 Drawing Sheets

(56) References Cited

U.S. PATENT DOCUMENTS

| | | | |
|---|---|---|---|
| 2008/0078064 A1 | 4/2008 | Lai | |
| 2013/0063911 A1* | 3/2013 | Shoji | G06F 1/1683 |
| | | | 361/755 |
| 2015/0233162 A1 | 8/2015 | Lee et al. | |
| 2018/0324964 A1 | 11/2018 | Yoo et al. | |
| 2019/0391613 A1* | 12/2019 | Sprenger | G06F 1/1681 |
| 2020/0275563 A1* | 8/2020 | Watamura | E05D 3/14 |

FOREIGN PATENT DOCUMENTS

| | | | |
|---|---|---|---|
| CN | 106487953 A | 3/2017 | |
| CN | 106707577 A | 5/2017 | |
| CN | 108667967 A | 10/2018 | |
| CN | 208609020 U | 3/2019 | |
| CN | 208986990 U | 6/2019 | |
| CN | 209373960 U | 9/2019 | |
| CN | 209375711 U | 9/2019 | |
| CN | 209390110 U | 9/2019 | |
| CN | 209402552 U | 9/2019 | |
| CN | 110445913 A | 11/2019 | |
| CN | 209593488 U | 11/2019 | |
| JP | H08123606 A | 5/1996 | |
| JP | 2001274569 A | 10/2001 | |
| WO | 2016203321 A2 | 12/2016 | |
| WO | 2017131311 A1 | 8/2017 | |

\* cited by examiner

FOLDABLE TERMINAL DEVICE INCLUDING AT LEAST THREE HOUSINGS COUPLED BY ROTATING SHAFTS

CROSS-REFERENCE TO RELATED APPLICATIONS

This application is a continuation of International Application No. PCT/CN2020/124521, filed on Oct. 28, 2020, which claims priority to Chinese Patent Application No. 201911190782.9, filed on Nov. 28, 2019. The disclosures of the aforementioned applications are hereby incorporated by reference in their entireties.

TECHNICAL FIELD

This application relates to the communication field, and in particular, to a foldable terminal device.

BACKGROUND

With upgrade of electronic products, display screens of various terminal devices such as mobile phones and tablet computers become larger. This is because a larger display screen can provide richer information for a user, improve man-machine communication efficiency, and bring better use experience. However, as a screen increases, an outline size of a base of a terminal device correspondingly increases; and as the size of the base of the terminal device increases, it is inconvenient to carry and place the terminal device. This restricts increasing of the size of the display screen.

Currently, a foldable technology well finds a compromise between miniaturization development of a base of a terminal device and large-screen development of a display screen. For example, after being folded, a foldable mobile phone has a same size as a conventional mobile phone, and can be conveniently carried. When a screen is expanded, a screen with a very large display area can be obtained.

A foldable terminal device has two housings, the two housings are connected by using a third housing, and a wire penetrates through an interior of the third housing and is connected to the two housings. In a process of folding and expanding the terminal device, the wire inside the third housing moves as the terminal device is folded and expanded. In the movement process, the wire is prone to scratch with another component, and consequently the wire is prone to wear.

SUMMARY

Embodiments of this application provide a foldable terminal device. A wire of the foldable terminal device is fastened to a third housing, to reduce abrasion of the wire.

According to a first aspect, an embodiment of this application provides a foldable terminal device, including a first housing, a second housing, a third housing, a wire, and a wire fastening assembly. Two rotating shafts are respectively disposed at both ends of the third housing, one side of the third housing is connected to the first housing through the two rotating shafts, the other side of the third housing is connected to the second housing through the two rotating shafts, at least one of the first housing and the second housing is rotatably connected to the third housing, the third housing is a semi-closed housing, a non-closed area of the third housing is provided with an opening area, and the wire fastening assembly is disposed between the two rotating shafts of the third housing. The wire penetrates through an interior of the third housing through the opening area of the third housing, the wire is connected to the wire fastening assembly inside the third housing, and both ends of the wire are respectively connected to the first housing and the second housing. The wire fastening assembly includes a first magnetic component and a magnetic assembly, the first magnetic component is fixedly connected to the interior of the third housing, the magnetic assembly is connected to the wire, and the magnetic assembly is magnetically connected to the first magnetic component. Because the wire located in the third housing is fastened by using the wire fastening assembly, a degree of freedom of the wire in the third housing can be reduced, so that a movement amount of the wire in the third housing can be reduced, a degree of abrasion of the wire can be reduced, and there are less worn parts of the wire. In a process of assembling the terminal device, the first magnetic component 51 may be fixedly connected to the interior of the third housing 3 in advance. In the assembly process, the wire is connected to the magnetic assembly, and the magnetic assembly connected to the wire penetrates into the third housing 3 from the first opening 31. Because there is a magnetic adsorption force between the magnetic assembly and the first magnetic component 51, after being placed into the third housing 3, the magnetic assembly automatically adsorbs on the first magnetic component 51. Then, the other end of the wire penetrates out from the second opening 32. It can be learned that, in this operation process, automatic positioning of the magnetic assembly and the first magnetic component 51 is implemented, and installation is relatively convenient.

In a possible implementation, the magnetic assembly includes a second magnetic component. The second magnetic component is connected to the first magnetic component; and the wire is disposed between the first magnetic component and the second magnetic component. In this way, the wire may be clamped by using a magnetic adsorption force between the first magnetic component 51 and the second magnetic component 54. This structure is relatively simple and is easy to implement.

In a possible implementation, the magnetic assembly further includes a support. The support is disposed between the second magnetic component and the first magnetic component. The wire includes a flexible printed circuit board, and the flexible printed circuit board is disposed between the support and the second magnetic component. The flexible printed circuit board is in contact with or connected to the support. The flexible printed circuit board is in contact with or connected to the second magnetic component. In this way, in the assembly process, the wire may be first fastened by using the support and the second magnetic component, and then the support and the second magnetic component that are used to fasten the wire are inserted into an intermediate housing from the opening area, so that a fastening position of the wire can be more accurately determined.

In a possible implementation, the wire includes a multilayer flexible printed circuit board, and the multilayer flexible printed circuit board is disposed between the support and the second magnetic component. The multilayer flexible printed circuit board satisfies one or more of the following content: Two adjacent layers of flexible printed circuit boards in the multilayer flexible printed circuit board are in contact (or referred to as movable contact) with each other. A flexible printed circuit board in the multilayer flexible printed circuit board that is in contact with the support is in contact (or referred to as movable contact) with or connected to the support. A flexible printed circuit board in the multilayer flexible printed circuit board that is in contact with the second magnetic component is in contact with or connected to the second magnetic component.

Therefore, the multilayer flexible printed circuit board in this embodiment of this application may be in contact (or referred to as movable contact), and do not need to be bonded by using an adhesive. This can avoid failure of the flexible printed circuit board caused by the adhesive, and improve reliability of the flexible printed circuit board. In addition, when the flexible printed circuit board in the multilayer flexible printed circuit board that is in contact with the support is in contact with the support, the flexible printed circuit board can slide in a process of folding and expanding the terminal device. Therefore, if there is an assembly tolerance, the tolerance can be more easily absorbed, so that lengths of the flexible printed circuit boards on the left and right sides of the wire fastening assembly can be more optimized. In addition, when the flexible printed circuit board in the multilayer flexible printed circuit board that is in contact with the second magnetic component is in contact with the second magnetic component, the flexible printed circuit board can slide in the process of folding and expanding the terminal device. Therefore, if there is an assembly tolerance, the tolerance can be more easily absorbed, so that lengths of the flexible printed circuit boards on the left and right sides of the wire fastening assembly can be more optimized. In another aspect, when the flexible printed circuit board in the multilayer flexible printed circuit board that is in contact with the second magnetic component is connected to the second magnetic component by using, for example, an adhesive or a double-sided tape, this can prevent the flexible printed circuit board from moving excessively unevenly on the left and right sides. In still another aspect, when the flexible printed circuit board in the multilayer flexible printed circuit board that is in contact with the support is connected to the support by using, for example, an adhesive or a double-sided tape, this can prevent the flexible printed circuit board from moving excessively unevenly on the left and right sides.

In a possible implementation, the wire includes a cable, and the cable is disposed on a plane of the support that faces the second magnetic component, or the cable is disposed on a plane of the support that faces the first magnetic component. The flexible printed circuit board is disposed at one end of the support, and the cable is disposed at the other end of the support. A distance between a first contact area and a second contact area that are on the support is greater than a preset distance, the first contact area includes a contact area between the flexible printed circuit board and the support, and the second contact area includes a contact area between the cable and the support. In this implementation, friction between the cable and the flexible printed circuit board in a bending process can be further reduced.

In a possible implementation, an arc groove is disposed on the support, and the cable is clamped to the arc groove. A center of the arc groove faces an end away from the flexible printed circuit board. In this way, a bending direction of the cable is fixed by a shape of the groove. Therefore, in a process of folding the terminal device, a degree of bending freedom of the cable can be reduced, friction between the cable and another component of the third housing (for example, an inner surface or a bearing of the third housing) can be reduced, and friction between the cable and the flexible printed circuit board can be reduced.

In a possible implementation, a fastener assembly is disposed on the support, the cable is clamped to the fastener assembly, the cable presents an arc in the fastener assembly, and a center of the arc presented by the cable in the fastener assembly faces the end away from the flexible printed circuit board. In this way, a bending direction of the cable is fixed by the fastener assembly. Therefore, in a process of folding the terminal device, a degree of bending freedom of the cable can be reduced, friction between the cable and another component of the third housing (for example, an inner surface or a bearing of the third housing) can be reduced, and friction between the cable and the flexible printed circuit board can be reduced.

In a possible implementation, stop blocks are disposed on a surface of the support that faces the first magnetic component, and the stop blocks are disposed at both sides of the first magnetic component. In this way, when the magnetic assembly moves leftward or rightward, the stop blocks are blocked by the first magnetic component, so as to limit a movement amount of the magnetic assembly in a horizontal direction.

In a possible implementation, the terminal device further includes: a buffer component, where the buffer component penetrates between the magnetic assembly and the third housing. In this way, friction and scratches between the wire and a first inner housing 35 can be reduced. In addition, when the terminal device is in an expanded state, the buffer component presents a multidimensional wave shape. In this way, a redundancy of the wire inside the third housing can be better and more naturally absorbed when the terminal device is in the expanded state.

In a possible implementation, a difference between a line length between the wire fastening assembly and the first housing and a line length between the wire fastening assembly and the second housing is within a preset range. In this way, the redundancy of the wire may be relatively evenly allocated to both sides of the wire fastening assembly.

In a possible implementation, the wire includes the cable, and the cable is made by using a rubber in-mold decoration technology. A diameter of an area that is on the cable and connected to the third housing, the first housing, and the second housing is greater than a preset diameter. A positioning structure is disposed in the area that is on the cable and connected to the third housing, the first housing, and the second housing. In this way, the cable can be more accurately positioned to the support, the first housing, and the second housing, and a service life of the cable can be increased by increasing a diameter of a contact area between the cable and another component.

In a possible implementation, an upper surface of the third housing includes a first inner housing, a second inner housing, and a third inner housing, and the upper surface of the third housing includes a surface on which a screen of the terminal device is laid; the second inner housing and the third inner housing are located at both sides of the first inner housing; one side of the second inner housing is rotatably connected to the first inner housing, and the other side is connected to the first inner housing; and one side of the third inner housing is rotatably connected to the first inner housing, and the other side is connected to the second inner housing. In this way, when the terminal device is in the folded state, the first inner housing, the second inner housing, and the third inner housing may form relatively large space, to reserve specific space for a folded area of the screen, so that the screen can be in a natural state as much as possible.

According to a second aspect, an embodiment of this application provides a foldable terminal device, including a first housing, a second housing, a third housing, a wire, a wire fastening assembly, and a buffer component. Two rotating shafts are respectively disposed at both ends of the third housing, one side of the third housing is connected to the first housing through the two rotating shafts, the other side of the third housing is connected to the second housing through the two rotating shafts, at least one of the first housing and the second housing is rotatably connected to the third housing, the third housing is a semi-closed housing, a non-closed area of the third housing is provided with an opening area, one side or a plurality of sides of the opening area is or are designed with a rounded corner, a diameter of the rounded corner is greater than a preset diameter, a wire fastening assembly is disposed between the two rotating shafts of the third housing, and a wire is fastened to the wire fastening assembly.

An upper surface of the third housing includes a first inner housing, a second inner housing, and a third inner housing, and the upper surface of the third housing includes a surface on which a screen of the terminal device is laid; the second inner housing and the third inner housing are located at both sides of the first inner housing; one side of the second inner housing is rotatably connected to the first inner housing, and the other side is connected to the first housing; and one side of the third inner housing is rotatably connected to the first inner housing, and the other side is connected to the second housing.

The wire includes a cable and a multilayer flexible printed circuit board. The wire penetrates through an interior of the third housing through the opening area of the third housing, both ends of the wire are respectively connected to the first housing and the second housing, the cable is made by using a rubber in-mold decoration technology, a diameter of an area that is on the cable and connected to the third housing, the first housing, and the second housing is greater than a preset diameter, and a positioning structure is disposed in the area that is on the cable and connected to the third housing, the first housing, and the second housing.

A difference between a line length between the wire fastening assembly and the first housing and a line length between the wire fastening assembly and the second housing is within a preset range. The wire fastening assembly includes a first magnetic component, a second magnetic component, and a support. The first magnetic component is fixedly connected to the interior of the third housing. The second magnetic component is magnetically connected to the first magnetic component. The support is disposed between the second magnetic component and the first magnetic component. Stop blocks are disposed on a surface of the support that faces the first magnetic component, and the stop blocks are disposed at both sides of the first magnetic component.

An arc groove is disposed on the support, the cable is clamped to the arc groove, and a center of the arc groove faces an end away from the multilayer flexible printed circuit board. Alternatively, a fastener assembly is disposed on the support, the cable is clamped to the fastener assembly, the cable presents an arc in the fastener assembly, and a center of the arc presented by the cable in the fastener assembly faces the end away from the multilayer flexible printed circuit board. The multilayer flexible printed circuit board is disposed at one end of the support, a multilayer cable is disposed at the other end of the support, a distance between a first contact area and a second contact area that are on the support is greater than a preset distance, the first contact area includes a contact area between the flexible printed circuit board and the support, and the second contact area includes a contact area between the cable and the support.

The multilayer flexible printed circuit board is disposed between the support and the second magnetic component, two adjacent layers of flexible printed circuit boards in the multilayer flexible printed circuit board are in contact (or referred to as movable contact) with each other. A flexible printed circuit board in the multilayer flexible printed circuit board that is in contact with the support is in contact with or connected to the support. A flexible printed circuit board in the multilayer flexible printed circuit board that is in contact with the second magnetic component is in contact with or connected to the second magnetic component. The buffer component penetrates between the magnetic assembly and the third housing, and when the terminal device is in an expanded state, the buffer component presents a multidimensional wave shape.

Because the wire located in the third housing is fastened by using the wire fastening assembly, a degree of freedom of the wire in the third housing can be reduced, so that a movement amount of the wire in the third housing can be reduced, a degree of abrasion of the wire can be reduced, and there are less worn parts of the wire. In a process of assembling the terminal device, the first magnetic component 51 may be fixedly connected to the interior of the third housing 3 in advance. In the assembly process, the wire is connected to the magnetic assembly, and the magnetic assembly connected to the wire penetrates into the third housing 3 from the first opening 31. Because there is a magnetic adsorption force between the magnetic assembly and the first magnetic component 51, after being placed into the third housing 3, the magnetic assembly automatically adsorbs on the first magnetic component 51. Then, the other end of the wire penetrates out from the second opening 32. It can be learned that, in this operation process, automatic positioning of the magnetic assembly and the first magnetic component 51 is implemented, and installation is relatively convenient. Further, one side or a plurality of sides of the opening area is or are designed with the rounded corner, and the diameter of the rounded corner is greater than the preset diameter. This can make peripheries of the first opening and the second opening that are in contact with the wire smoother, thereby further reducing a degree of abrasion of the wire.

BRIEF DESCRIPTION OF THE DRAWINGS

FIG. 3a is a schematic cross-sectional view in a direction D in FIG. 2a;

FIG. 3l is a schematic diagram of a structure of an upper surface in FIG. 2a;

REFERENCE NUMERALS

1—First housing
11—First threaded hole
12—Screen
2—Second housing
21—Second threaded hole
3—Third housing
31—First opening
32—Second opening
33—Rotating shaft
34—Outer housing
35—First inner housing
351—Second inner housing
352—Third inner housing
41—Flexible printed circuit board
42—Cable
421—First positioning area
422—Second positioning area
423—Third positioning area
5—Wire fastening assembly
51—First magnetic component
53—Support
531—Groove
533—Fastener
534—Hole
535—Stop block
536—First contact area
537—Second contact area
538—Step structure
539—Boss structure
540—First surface
541—Second surface
54—Second magnetic component
6—Buffer component
7—Steel sheet
8—Foam
9—Presser

DETAILED DESCRIPTION OF ILLUSTRATIVE EMBODIMENTS

A terminal device in embodiments of this application is a foldable device. The terminal device in embodiments of this application may include a device that provides a user with voice and/or data connectivity, for example, a handheld device with a wireless connection function, or a processing device connected to a wireless modem. The terminal device may communicate with a core network through a radio access network (RAN), and exchange a voice and/or data with the RAN. The terminal device may include user equipment (UE), a wireless terminal device, a mobile terminal device, a device-to-device (D2D) communication terminal device, a V2X terminal device, a machine-to-machine/machine-type communication (M2M/MTC) terminal device, an internet of things (IoT) terminal device, a subscriber unit (subscriber unit), a subscriber station, a mobile station, a remote station, an access point (AP), a remote terminal, an access terminal, a user terminal, a user agent, a user device, or the like. For example, the terminal device may include a mobile phone (or referred to as a "cellular" phone), a computer with a mobile terminal device, or a portable, pocket-sized, handheld, or computer built-in mobile apparatus, for example, a device such as a personal communication service (PCS) phone, a cordless phone, a session initiation protocol (SIP) phone, a wireless local loop (WLL) station, or a personal digital assistant (PDA). The terminal device further includes a limited device, for example, a device with low power consumption, a device with a limited storage capacity, or a device with a limited computing capability. For example, the terminal device includes an information sensing device such as a barcode, radio frequency identification (RFID), a sensor, a global positioning system (GPS), or a laser scanner.

Figure 1A:
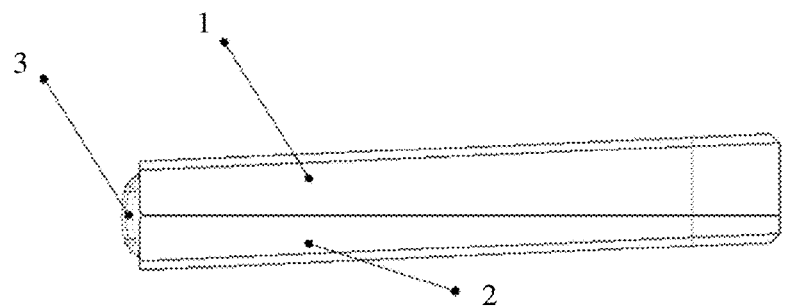
FIG. 1a is a schematic diagram of a structure of a terminal device in a folded state according to an embodiment of this application.
Figure 1B:
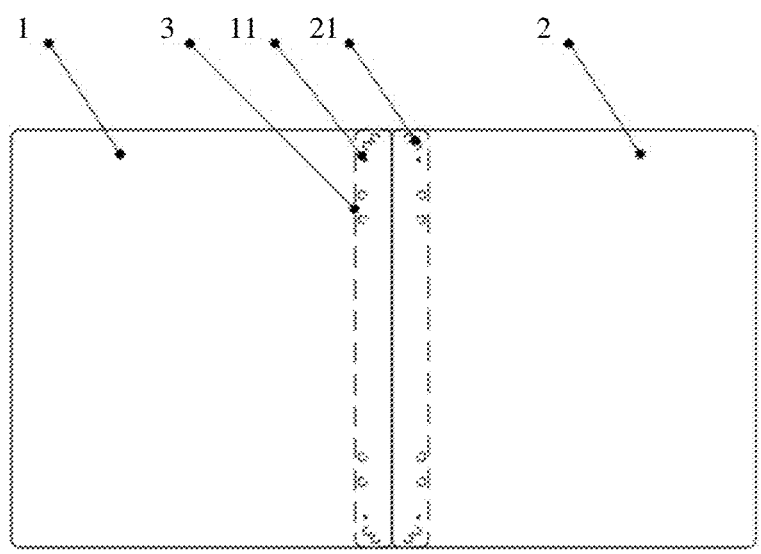
FIG. 1b is a schematic diagram of a structure of a terminal device in an expanded state according to an embodiment of this application.

FIG. 1a shows an example of a schematic diagram of a structure of a terminal device in a folded state according to an embodiment of this application. When the terminal device is in the folded state, a screen of the terminal device may be folded. FIG. 1b shows an example of a schematic diagram of a structure of the terminal device in an expanded state according to this embodiment of this application. When the terminal device is in the expanded state, the screen is in an expanded state. In this embodiment of this application, one side that is of the terminal device in the expanded state and on which the screen is located is referred to as a screen side, and the other side opposite to the screen side is referred to as a housing side. FIG. 1b shows a schematic diagram of a structure of the housing side of the terminal device in the expanded state, that is, a schematic diagram of a structure of a side opposite to the screen side of the terminal device. In this embodiment of this application, the expanded state may also be referred to as an unfolded state.

As shown in FIG. 1a, when the terminal device is in the folded state, a part of a side surface of a third housing 3 is exposed (as shown in the figure, the part of the third housing 3 is exposed, and in actual application, another component may be used to block the exposed part of the third housing 3). As shown in FIG. 1b, when the terminal device is in the expanded state, the third housing 3 on the housing side of the terminal device is blocked by a first housing 1 and a second housing 2 (in the figure, an example in which the third housing is completely blocked by the first housing 1 and the second housing 2 is used for illustration, and in actual application, when the terminal device is in the expanded state, the third housing 3 may not be completely blocked by the first housing 1 and the second housing 2). In FIG. 1b, the third housing 3 is indicated by using a dashed line. As shown in FIG. 1b, some first threaded holes 11 are further disposed on the third housing, and are configured to connect the third housing 3 to the first housing 1. Some second threaded holes 21 are disposed on the second housing 2, and are configured to connect the third housing 3 to the second housing 2. A component such as a battery cover or a small screen may be covered above a side that is of the third housing and on which the first threaded hole 11 and the second threaded hole 21 are disposed, and the covered component such as the battery cover or the small screen may block the first threaded hole 11 and the second threaded hole 21.

Figure 2A:
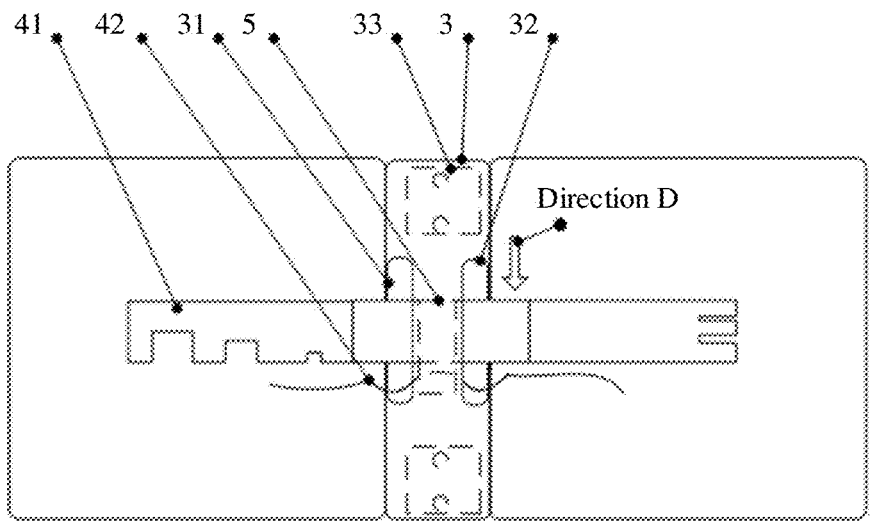
FIG. 2a is a schematic diagram of a structure of a terminal device from which a part of a first housing and a part of a second housing in FIG. 1b are removed.

To show an internal structure of the terminal device more clearly, FIG. 2a shows an example of a schematic diagram of a structure of the terminal device from which a part of the first housing 1 and a part of the second housing 2 in FIG. 1b are removed. As shown in FIG. 2a, after the part of the first housing and the part of the second housing are removed, the blocked third housing 3 and a wire can be seen. In FIG. 2a, the terminal device includes the first housing 1, the second housing 2, the third housing 3, the wire, and a wire fastening assembly 5. In FIG. 2a, the wire is shown by using a flexible printed circuit board 41 and a cable 42 as an example. In a specific embodiment, the wire may include the flexible printed circuit board 41 and/or the cable 42.

As shown in FIG. 2a, two rotating shafts 33 may be respectively disposed at both ends of the third housing 3. The rotating shaft 33 is disposed inside the third housing 3, and is indicated by using a dashed line in FIG. 2a. One side of the third housing 3 may be connected to the first housing 1 through the rotating shaft 33, the other side of the third housing may be connected to the second housing 2 through the rotating shaft 33, and at least one of the first housing 1 and the second housing 2 is rotatably connected to the third housing 3 through the rotating shaft 33. To show the internal structure of the terminal device more clearly, a part of the first housing 1 and a part of the second housing 2 are removed in FIG. 2a.

As shown in FIG. 2a, the third housing 3 may be a semi-closed housing. A non-closed area may be disposed on the side surface of the third housing 3. The non-closed area of the third housing 3 may be one or more opening areas. The opening area may be configured to enable the wire to penetrate through an interior of the third housing 3 during assembly of the terminal device. The wire penetrates through the interior of the third housing 3 through the opening area of the third housing 3, and both ends of the wire are respectively connected to the first housing 1 and the second housing 2. For example, both ends of the wire may be respectively connected to a primary board and a secondary board (or an antenna) of the terminal device. As shown in FIG. 2a, the opening area of the third housing 3 may include a first opening 31 and a second opening 32. The first opening 31 and the second opening 32 may be disposed at a relatively middle position of the third housing 3, or may be adjusted based on a specific assembly situation of the wire. In an assembly process, the wire needs to penetrate into the third housing 3 through the first opening 31 and penetrate out from the second opening 32. Optionally, the wire may alternatively penetrate into the third housing 3 through the second opening 32 and penetrate out from the first opening 31.

In this embodiment of this application, the wire may be configured to transfer a power supply, a signal, heat, and the like between the first housing 1 and the second housing 2. In this embodiment of this application, the wire may include the flexible printed circuit board 41 and/or the cable 42. The cable 42 may be a coaxial cable. The flexible printed circuit board 41 may be a flexible printed circuit (FPC). As shown in FIG. 2a, the flexible printed circuit board 41 may pass through the third housing 3 and be connected to both the first housing 1 and the second housing 2. The cable 42 may pass through the third housing 3 and is connected to both the first housing 1 and the second housing 2. The cable 42 is connected to the third housing 3 by using the wire fastening assembly 5.

A part of the wire is blocked when passing through the third housing 3. In FIG. 2a, parts of the cable 42 and the flexible printed circuit board 41 that are blocked by the third housing 3 are indicated by using dashed lines.

As shown in FIG. 2a, the wire fastening assembly 5 may be disposed inside the third housing 3, for example, may be disposed between the rotating shafts at both ends of the third housing. The wire is connected to the wire fastening assembly 5. In FIG. 2a, because the wire fastening assembly 5 is fastened inside the third housing 3 and is blocked by the third housing 3, the wire fastening assembly 5 is indicated by using a dashed line in FIG. 2a.

Figure 2B:
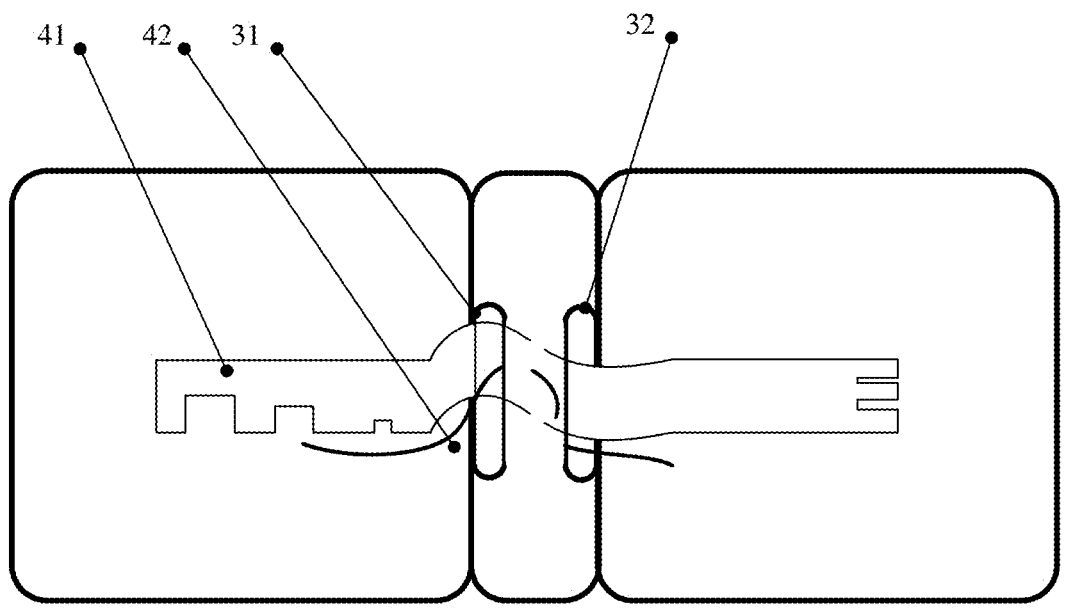
FIG. 2b is a schematic diagram of a structure of a terminal device after a wire fastening assembly 5 in FIG. 2a is removed.
Figure 3A:
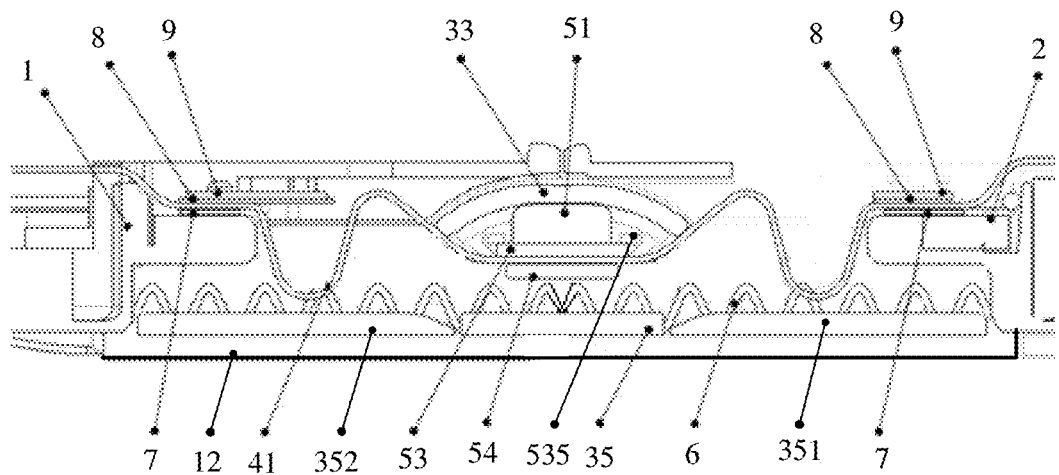

To describe some beneficial effects of this embodiment of this application, FIG. 2b is a schematic diagram of a structure of a terminal device obtained after the wire fastening assembly 5 in FIG. 2a is removed. As shown in FIG. 2b, if the wire is not fastened inside the third housing 3 by using the wire fastening assembly 5, a degree of freedom of the wire in the third housing 3 is relatively large, and a bending form of the wire is relatively random (in this embodiment of this application, the bending form of the wire may refer to a bending shape of the wire). In one aspect, friction or a scratch is prone to occur between the wire and the rotating shaft 33 in the third housing 3, a degree of abrasion is relatively severe, and there are a relatively large quantity of worn parts of the wire. In another aspect, there may be some gaps on the side surface of the third housing 3. In a process of folding and expanding the terminal device, the wire moves accordingly, and may protrude from the gap of the third housing 3 in the movement process. This aggravates abrasion of the wire. In addition, the wire may be torn off in the process of folding the terminal device because the wire is stuck in the gap, and reliability of the wire is relatively low. In a third aspect, in the process of folding the terminal device, the wire may be pulled to one side, and in a process of folding the terminal device for a plurality of times, the wire may be torn off. In a fourth aspect, because the bending form of the wire is relatively random, relatively large space is needed in a cavity of the third housing 3 for the wire to move, which is unfavorable to miniaturization development of the terminal device. In a fifth aspect, to provide movement space for a redundancy of the wire, a hole is usually designed on an upper surface of the third housing 3. However, the hole on the upper surface of the third housing 3 is prone to cause sinking of a flexible screen. The upper surface of the third housing 3 is a side of the third housing 3 that faces the screen, or the upper surface of the third housing 3 includes a surface on which the screen is laid. In FIG. 3a related to the following content, an upper surface of an intermediate housing refers to a surface including a first inner housing 35, a second inner housing 351, and a third inner housing 352.

However, as shown in FIG. 2a, because the wire located in the third housing 3 is fastened by using the wire fastening assembly 5, a degree of freedom of the wire in the third housing 3 can be reduced, so that a movement amount of the wire in the third housing 3 can be reduced. In addition, after the degree of freedom of the wire is limited, the bending form of the wire is relatively fixed. In one aspect, friction or scratches between the wire and the rotating shaft 33 in the third housing 3 can be reduced, a degree of abrasion of the wire can be reduced, and there are less worn parts of the wire. In a second aspect, because the wire is fastened by using the wire fastening assembly 5, the bending form of the wire may be limited within a specific range, for example, the wire is kept away from the gap on the side surface of the third housing 3 as far as possible. In this way, in the process of folding and expanding the terminal device, the wire is not stuck in the gap of the third housing 3 in the process of folding the terminal device, abrasion caused to the wire by the gap of the third housing 3 can be avoided, and reliability of the wire can be improved. In a third aspect, because the wire is fastened by using the wire fastening assembly 5, in the process of folding the terminal device, the wire is not likely to be excessively pulled, so that a possibility that the wire is torn off can be reduced, and reliability of the wire can be improved. In a fourth aspect, because the bending form of the wire is limited, relatively small space is needed in the cavity of the third housing 3 for the wire to move, which can lay a foundation for miniaturization development of the terminal device. In a fifth aspect, in the solution provided in this embodiment of this application, the bending form of the wire is relatively fixed, and activity space of the redundancy does not need to be relatively large. Therefore, the hole on the upper surface of the third housing 3 can be avoided, and sinking of the flexible display due to the hole can be avoided.

Further, as shown in FIG. 2a, because the wire fastening assembly 5 fastens the wire inside the third housing 3, a length of a wire between the wire fastening assembly 5 and the first housing 1 may be controlled, and a length of a wire between the wire fastening assembly 5 and the second housing 2 may be controlled. The length of the wire that is between the wire fastening assembly 5 and the first housing 1 and that is located inside the third housing 3 is referred to as a first length, and the length of the wire that is between the wire fastening assembly 5 and the second housing 2 and that is located inside the third housing 3 is referred to as a second length. The first length and the second length are controlled by using the wire fastening assembly 5, and do not change greatly in the process of expanding and folding the terminal device. In this way, it can be ensured that the first length and the second length meet a requirement of the terminal device in the expanding and folding process. This reduces pulling of the terminal device on the wire in the expanding and folding process caused by movement of the wire in the third housing 3. Therefore, a failure case of the wire can be reduced, and reliability of the wire can be improved.

With reference to FIG. 2a, this embodiment of this application provides an optional implementation. In this implementation, a difference between a line length of the wire between the wire fastening assembly 5 and the first housing 1 and a line length of the wire between the wire fastening assembly 5 and the second housing 2 is within a preset range. In other words, a difference between the first length and the second length is within a preset range. In this case, the wire fastening assembly 5 basically fastens a middle position of the wire located inside the third housing 3. In this implementation, the redundancy of the wire may be relatively evenly allocated to both sides of the wire fastening assembly 5, so that a difference between line lengths of both sides of the wire fastening assembly 5 can be reduced, and abrasion of wires on both sides of the wire fastening assembly 5 can be balanced. This avoids excessive abrasion of one side of the wire fastening assembly 5, and improves reliability of the wire.

As shown in FIG. 2a, in a process of assembling the terminal device, the following operations may be performed: The wire penetrates through the first opening 31 of the third housing 3 and penetrates out from the second opening 32, and is fastened to the third housing 3 by using the wire fastening assembly 5. A size of the third housing 3 of the terminal device is usually relatively small, for example, a thickness size of the third housing 3 may be 5 millimeters or 6 millimeters. That is, operable space of the third housing 3 is very small. Therefore, the foregoing operation is technically difficult. To resolve this problem, this embodiment of this application provides a possible implementation. The following provides detailed descriptions.

FIG. 3a is a schematic cross-sectional view in a direction D in FIG. 2a. In other words, FIG. 3a is a schematic diagram of a structure of an end surface of a middle part of the third housing. As shown in FIG. 3a, the wire fastening assembly 5 may include a first magnetic component 51 and a magnetic assembly. The first magnetic component 51 is fixedly connected to the interior of the third housing 3. The magnetic assembly is connected to the wire. The magnetic assembly may include a second magnetic component 54.

In the process of assembling the terminal device, the first magnetic component 51 may be fixedly connected to the interior of the third housing 3 in advance. In the assembly process, specific operations are as follows: The wire is connected to the magnetic assembly, and the magnetic assembly connected to the wire penetrates into the third housing 3 from the first opening 31. Because there is a magnetic adsorption force between the magnetic assembly and the first magnetic component 51, after being placed into the third housing 3, the magnetic assembly automatically adsorbs on the first magnetic component 51. Then, the other end of the wire penetrates out from the second opening 32. It can be learned that, in this operation process, an assembler fastens the wire to the magnetic assembly, and penetrates the magnetic assembly connected to the wire into the third housing 3. The magnetic assembly is adsorbed by the magnetic adsorption force of the first magnetic component 51, so that the magnetic assembly and the first magnetic component 51 are automatically positioned. The magnetic assembly connected to the wire is also adsorbed by the magnetic adsorption force to the first magnetic component 51, so that the magnetic assembly can be automatically positioned. This implementation can prevent expanding the size of the third housing 3 for ease of assembly. In addition, because automatic positioning can be implemented in a process of penetrating the wire into the third housing 3, other parts except the opening area of the third housing 3, for example, the rotating shaft 33 and both ends of the third housing 3, can be closed, and a size of a semi-closed third housing 3 can be further reduced. This provides technical support for a thinner terminal device.

In an optional implementation, the magnetic assembly may not include a support 53 (the implementation is not shown in the accompanying drawings). In this implementation, the second magnetic component 54 may be magnetically connected to the first magnetic component 51. The second magnetic component 54 may be provided with a groove 531 or another structure that can fasten the wire, so that the wire is fastened by using the groove 531 or the structure that fastens the wire and that is disposed on the second magnetic component 54. In another optional implementation, the second magnetic component 54 may not be provided with the groove 531 or another structure that can fasten the wire, the wire directly penetrates between the first magnetic component 51 and the second magnetic component 54, and the wire is clamped by using a magnetic adsorption force between the first magnetic component 51 and the second magnetic component 54.

In another optional implementation, as shown in FIG. 3*a*, the magnetic assembly inside the third housing 3 may include the support 53 and the second magnetic component 54. The support 53 is disposed between the first magnetic component 51 and the second magnetic component 54. The intermediate housing may include an outer housing 34, the first inner housing 35, the second inner housing 351, and the third inner housing 352. As shown in FIG. 3*a*, a lower surface of the third housing 3 includes the outer housing 34, and an upper surface of the third housing includes the first inner housing 35, the second inner housing 351, and the third inner housing 352. In other words, in this embodiment of this application, housings on a side of the third housing 3 that is relatively close to the screen are referred to as the first inner housing 35, the second inner housing 351, and the third inner housing 352, and a housing on a side that is relatively far away from the screen is referred to as the outer housing 34. A person skilled in the art may learn that names of the outer housing 34, the first inner housing 35, the second inner housing 351, and the third inner housing 352 are merely used for differentiation, and have no other actual limitation meanings. In this embodiment of this application, the third housing 3 is provided with a rotating shaft, and the rotating shaft is used to connect the first housing 1 and the second housing 2. Therefore, in some actual application scenarios, the third housing 3 may also be commonly referred to as a rotating shaft, the outer housing 34 may also be referred to as an outer shaft, the first inner housing 35 may also be referred to as a first inner shaft, the second inner housing 351 may also be referred to as a second inner shaft, and the third inner housing 352 may also be referred to as a third inner shaft. These are merely different names of components in the art. In a possible implementation, when the terminal device is in an expanded state, the outer housing 34 is blocked by the first housing 1 and the second housing 2. When the terminal device is in a folded state, the outer housing 34 is completely or partially exposed.

As shown in FIG. 3*a*, the wire penetrates into the third housing 3 from the first opening 31, and penetrates out of the third housing 3 from the second opening 32. Friction occurs between the wire and edges of the first opening 31 and the second opening 32. It can be seen from FIG. 3*a* that peripheries of the first opening 31 area and the second opening 32 area also limit the wire. Optionally, rounding is performed on peripheries of the first opening 31 and the second opening 32. Rounding may be performed on all peripheries of the first opening 31 and the second opening 32, or rounding may be performed on some peripheries of the first opening 31 and the second opening 32. For example, rounding is performed on a side that is of the first opening 31 and in a direction parallel to a center line of the third housing 3. For another example, rounding is performed on a side that is of the second opening 32 and in a direction parallel to a center line of the third housing 3. Optionally, a diameter of rounding may be set to be larger, for example, may be greater than 1.5 millimeters. In this way, peripheries of the first opening 31 and the second opening 32 that are in contact with the wire are smoother, so that abrasion on the wire can be further reduced. In addition, because the peripheries of the first opening 31 area and the second opening 32 area also limit the wire, when the terminal device is in the expanded state, the wire inside the third housing 3 can maintain a specific arc, thereby further limiting a bending form.

Figure 3B:
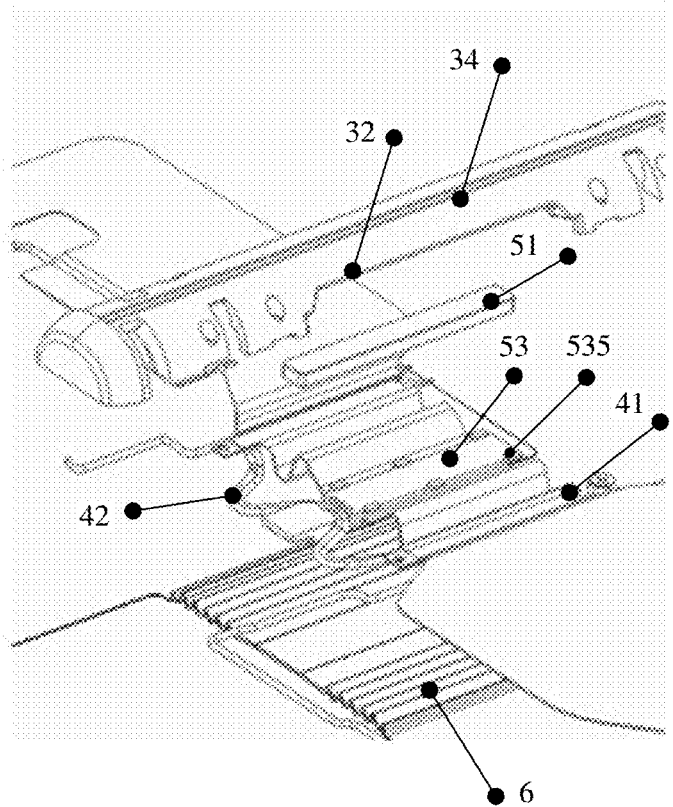
FIG. 3b is an exploded view of an internal structure of a third housing of a terminal device according to an embodiment of this application.

FIG. 3*b* is an exploded view of an internal structure of a third housing of a terminal device according to an embodiment of this application. In FIG. 3*b*, an internal structure of an intermediate housing area of the terminal device can be seen more clearly in a form of the exploded view, and a structure form of the outer housing 34 of the intermediate housing can be seen from FIG. 3*b*. The outer housing is an arc-shaped housing, and an opening area is disposed in a middle part. The second opening 32 disposed in a middle position of the outer housing 34 can be clearly seen in FIG. 3*b*. The first opening 31 is located at a position symmetrical to the second opening 32, and is not shown in FIG. 3*b*.

As shown in FIG. 3*b*, when the wire includes the flexible printed circuit board 41, the flexible printed circuit board 41 may be disposed between the support 53 and the second magnetic component 54. When the wire includes the cable 42, the cable 42 may be connected to the support 53. For example, the groove 531 (for example, the groove 531 of the support 53 in FIG. 3*f* below) may be disposed on the support 53 to clamp the cable 42. The cable 42 may be fastened to a surface of the support 53 that faces the first magnetic component 51, or may be fastened to a surface of the support 53 that faces the second magnetic component 54. In the following content and accompanying drawings, an example in which the magnetic assembly includes the support 53 is used for description. It should be noted that a material of a magnetic component (for example, the first magnetic component 51 and the second magnetic component 54) in this embodiment of this application may be a soft magnetic material, and a magnetic force of the magnetic component may be adjusted based on a requirement.

As shown in FIG. 3*b*, it can be seen that the first magnetic component 51 may be a rectangular magnetic component. In FIG. 3*b*, only a rectangle is used as an example for display. In specific implementation, a shape of the first magnetic component may be set freely, for example, may be set to an irregular shape. It can be further seen from FIG. 3*b* that a buffer component has a specific width, for example, may be a wavy film with a specific width, penetrates through the intermediate housing, and is located between the support and the first inner housing 35, to provide buffer protection for the wire.

Figure 3C:
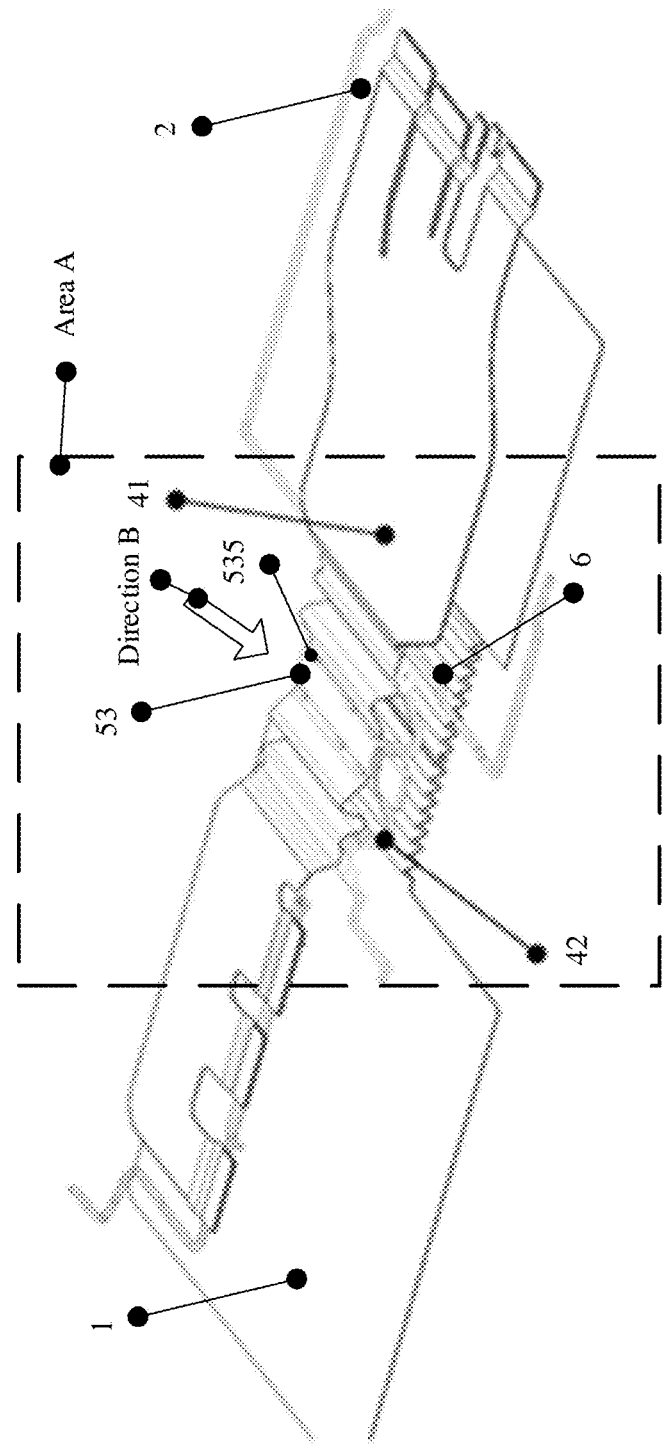
FIG. 3c is a schematic diagram of a structure obtained after an outer housing and a first magnetic component in FIG. 3b are removed.

FIG. 3*c* is a schematic diagram of a structure obtained after the outer housing and the first magnetic component 51 in FIG. 3*b* are removed. FIG. 3*c* also shows a structural form of a connection between the flexible printed circuit board penetrating inside the intermediate housing and the first housing and the second housing. As shown in FIG. 3*c*, one side of the flexible printed circuit board is laid on the first housing 1, and the other side is laid on the second housing 2.

Figure 3D:
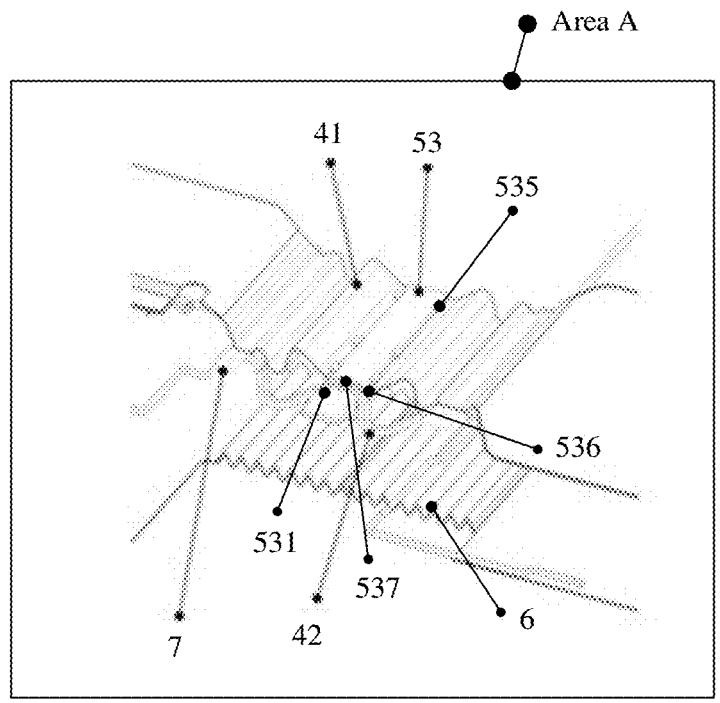
FIG. 3d is a partial enlarged diagram of an area A in FIG. 3c.

FIG. 3*d* is a partial enlarged diagram of an area A in FIG. 3*c*. Arrangement of the cable and the flexible printed circuit board on the support can be seen from FIG. 3*d*. Generally, the cable and the flexible printed circuit board may be arranged at two ends of the support. Optionally, there may be a specific distance between the cable disposed on the support and the flexible printed circuit board disposed on the support, so as to reduce friction between the cable and the flexible printed circuit board, and reduce abrasion of the cable and the flexible printed circuit board. That is, a distance between the groove 531 of the support 53 and the flexible printed circuit board 41 fastened on the support 53 may be increased. As shown in FIG. 3d, optionally, a distance between a first contact area 536 and a second contact area 537 that are on the support 53 is greater than a preset distance, the first contact area 536 includes a contact area between the flexible printed circuit board 41 and the support 53, and the second contact area 537 includes a contact area between the cable 42 and the support 53. The first contact area 536 may be a contact area between the support 53 and a side of the flexible printed circuit board 41 that is relatively close to the cable 42, and the second contact area 537 may be a contact area between the support 53 and a position that is on the cable 42 and that is relatively close to the flexible printed circuit board 41. Optionally, a distance between the first contact area 536 and the second contact area 537 on the support 53 may be a shortest distance between the flexible printed circuit board 41 and the cable 42 on the support 53. The preset distance may be determined based on experience, for example, may be set to 2 millimeters or 3 millimeters. In this implementation, friction between the cable 42 and the flexible printed circuit board 41 in a bending process can be further reduced. In a third aspect, the cable 42 presents a W-shaped wave, and a bending radius of the cable 42 is relatively large. This can reduce a fatigue degree of the cable 42, and increase a service life of the cable 42. In a fourth aspect, it can be seen from FIG. 3c that the flexible printed circuit board 41 presents a W-shaped wave, and a bending radius of the flexible printed circuit board 41 is relatively large. This can reduce a fatigue degree of the flexible printed circuit board 41, and increase a service life of the flexible printed circuit board 41.

Figure 3E:
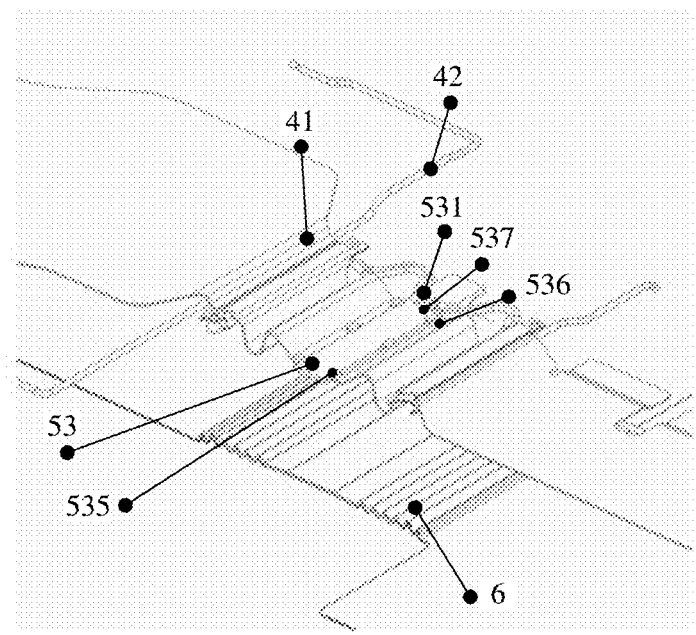
FIG. 3e is a view shown in a direction B in FIG. 3b.

FIG. 3e is a view shown in a direction B in FIG. 3c. As shown in FIG. 3e, from a perspective of the direction B in FIG. 3c, a structural form of another end of the support can be seen. As shown in FIG. 3e, the another end of the support may be aligned with an end surface of the flexible printed circuit board. Optionally, the another end of the support may also be slightly longer than the flexible printed circuit board, so that the support can span the entire flexible printed circuit board, to provide more protection for the flexible printed circuit board.

As shown in FIG. 3e, a buffer component 6 is disposed between the second magnetic component 54 and the third housing 3. In an optional implementation, the buffer component 6 is laid between the wire and the first inner housing 35, to reduce friction and scratches between the wire and the first inner housing 35. A width of the buffer component 6 located inside the intermediate housing is greater than a width of the flexible printed circuit board 41 located inside the intermediate housing, so that the buffer component 6 can provide better protection for the flexible printed circuit board 41 located inside the intermediate housing.

As shown in FIG. 3e, the buffer component 6 is stretched in a process of folding the terminal device, and is compressed inside the third housing 3 in a process of expanding the terminal device. Optionally, the buffer component 6 may be a film having a specific width. The width of the buffer component 6 refers to a size of the buffer component 6 in a direction parallel to the center line of the third housing 3. The width of the buffer component 6 may be greater than a size of an area occupied by the wire in the direction parallel to the center line of the third housing 3. In this way, when the wire is bent, the buffer component 6 can better protect the wire.

When the terminal device is in the folded state, the wire in the third housing 3 is stretched, and a length of the wire in the third housing 3 of the terminal device in the folded state is L1. When the terminal device is in the expanded state, the wire in the third housing 3 is bent and retracted in the third housing 3. When the terminal device is in the expanded state, a length of the wire in the third housing 3 of the terminal device in the expanded state is L2. L1 is greater than L2. That is, a length of the wire of the third housing 3 needs to be at least greater than L1, and when the terminal device is in the expanded state, at least a wire segment of a length (L1-L2) is bent inside the third housing 3 as a redundancy. Optionally, the buffer component 6 may be set to the wave shape shown in FIG. 3e. In this way, when the terminal device is in the expanded state, the buffer component 6 presents a multidimensional curve state. In other words, when the terminal device is in the expanded state, the buffer component 6 presents a wave shape. In this way, the redundancy of the wire inside the third housing 3 can be better and more naturally absorbed when the terminal device is in the expanded state. In addition, because the buffer component 6 is in a wave shape, in the process of expanding and folding the terminal device, a redundancy of the buffer component 6 may also move in the third housing 3 in a preset form.

In specific implementation, the buffer component 6 may be a wave-shaped film made of a flexible material such as a polyimide film, Mylar, polyethylene terephthalate (PET), or rubber. In an optional implementation, a heat dissipation material (for example, graphite) may be added to the buffer component 6, so that heat of the first housing 1 and the second housing 2 is conducted by using the buffer component 6, to balance temperatures of the first housing 1 and the second housing 2.

Figure 3F:
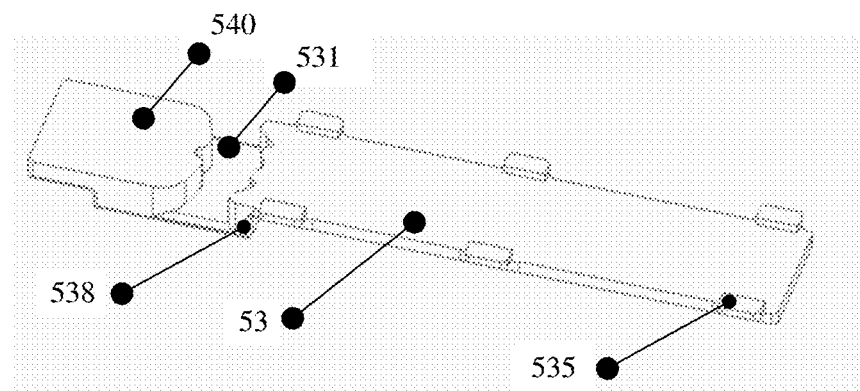
FIG. 3f is a schematic diagram of a structure of a support in FIG. 3b.

FIG. 3f is a schematic diagram of a structure of the support 53 in FIG. 3b. As shown in FIG. 3f, a structure of a support may be a mechanical part having a groove. FIG. 3f shows an arc structure of the groove 531 on the support 53. Further, it can be seen from FIG. 3f that, in this embodiment of this application, to clamp the groove more tightly to the cable disposed in the groove, a side of the groove may be set to a sawtooth shape. In addition, because the flexible printed circuit board 41 and the cable 42 may be located at two ends of the support 53, as shown in FIG. 3f, a center of the groove 531 that is on the support 53 and that is used to clamp the cable 42 may face a side away from the flexible printed circuit board 41. In this way, because the groove 531 has a specific angle, after the cable 42 is fastened in the groove 531, a bending direction of the cable 42 is fixed by a shape of the groove 531. Therefore, in a process of folding the terminal device, a degree of bending freedom of the cable 42 can be reduced, friction between the cable 42 and another component of the third housing 3 (for example, an inner surface or a bearing of the third housing 3) can be reduced, and friction generated by the cable 42 can also be reduced. Further, because the center of the groove 531 faces the end away from the flexible printed circuit board 41, friction between the cable 42 and the flexible printed circuit board 41 can be reduced in a bending process of the cable 42.

As shown in FIG. 3f, because the flexible printed circuit board and the cable are respectively disposed on two different surfaces of the support, a groove is disposed on a first surface 540 of the support (the first surface of the support is a surface of the support that is relatively far away from the screen), to place the cable, and the flexible printed circuit board is placed on a second surface of the support (the second surface of the support is a surface of the support that is relatively close to the screen; in FIG. 3*f*, because the second surface is opposite to the first surface 540, the second surface cannot be seen in FIG. 3*f*, and therefore the second surface is not shown in FIG. 3*f*). To isolate the flexible printed circuit board from the cable, a step structure 538 may be disposed on the second surface of the support, to reduce displacement of the flexible printed circuit board towards the cable, so as to reduce friction between the cable and the flexible printed circuit board support.

As shown in FIG. 3*f*, the support 53 further includes stop blocks 535. The stop blocks 535 may be disposed on a surface of the support 53 that faces the first magnetic component 51, and the stop blocks 535 may be disposed at two sides of the support 53. As shown in FIG. 3*a*, the stop blocks 535 may be some protruding structural blocks disposed at two sides of the support 53. The stop blocks 535 are located at two sides of the first magnetic component 51. When the magnetic assembly moves leftward or rightward, the stop blocks 535 are blocked by the first magnetic component 51, so as to limit a movement amount of the magnetic assembly in a horizontal direction. Because left and right sides of the first magnetic component 51 of the support 53 are provided with the stop blocks 535, a movement amount of the wire in the horizontal direction shown in FIG. 3*a* may be limited. This can alleviate a problem that the wire moves a lot in the horizontal direction caused by pulling the wire in the process of folding the terminal device, and further stabilize a form of the wire inside the third housing 3. The horizontal direction mentioned in this embodiment of this application is a direction perpendicular to the center line of the third housing 3 on a plane formed by a screen 12 when the terminal device is in the expanded state.

FIG. 3*b* to FIG. 3*f* are described by using an example in which the groove 531 is disposed on the support 53. In another implementation, a structure used to fasten the cable 42 on the support 53 may be set as a fastener assembly. In FIG. 3*g* to FIG. 3*k*, an example in which a structure used to fasten the cable 42 on the support 53 in FIG. 2*a* is a fastener assembly is used for illustration, and detailed description is provided below.

Figure 3G:
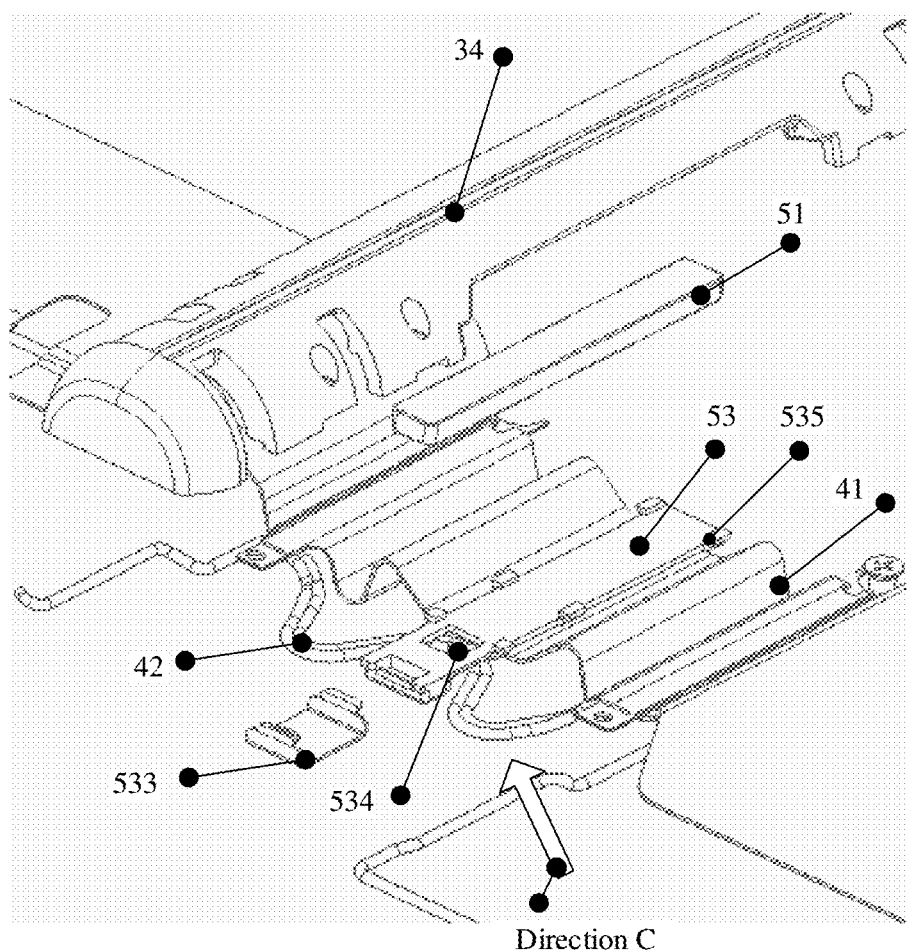
FIG. 3g is an exploded view of an internal structure of a third housing of another terminal device according to an embodiment of this application.

FIG. 3*g* is an exploded view of an internal structure of a third housing of another terminal device according to an embodiment of this application. In FIG. 3*g*, an internal structure of an intermediate housing area of the terminal device can be seen more clearly in a form of the exploded view. Compared with FIG. 3*b*, in FIG. 3*g*, only a structural shape of a support is changed. It can be seen from FIG. 3*g* that, the fastener assembly of the support 53 includes two parts, which are respectively a fastener 533 and a hole 534. A structural form that a cable is placed on a hole can be seen from FIG. 3*g*. In FIG. 3*g*, the fastener 533 is not clamped to the hole 534. It can be seen from 3*g* that the hole 534 may be a rectangular hole, and the fastener 533 may be a mechanical part with ears at both ends.

Figure 3H:
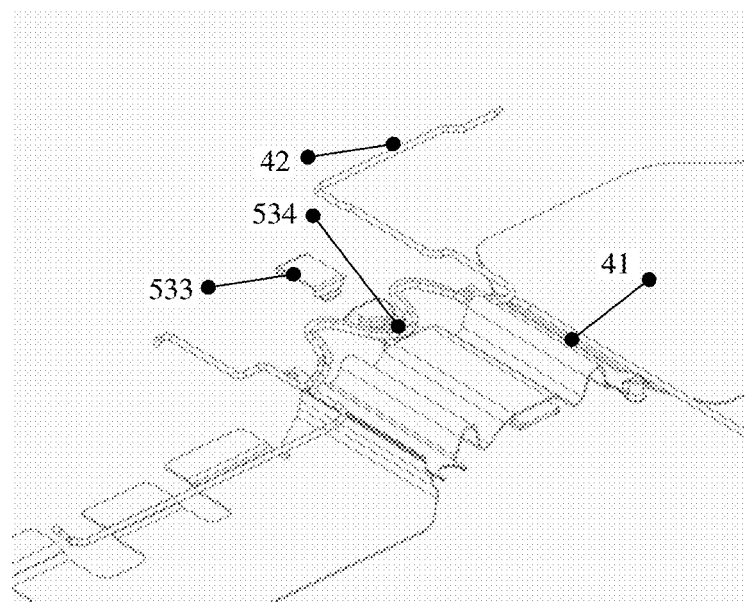
FIG. 3h is a schematic diagram of a structure in a direction C obtained after an outer housing, a first magnetic component, and a buffer component in FIG. 3g are removed.

FIG. 3*h* is a schematic diagram of a structure in a direction C obtained after an outer housing, the first magnetic component 51, and the buffer component 6 in FIG. 3*g* are removed. That is, FIG. 3*h* is a schematic diagram of a structure of a rear side of the support. A rear side structure of the fastener and a rear side structure of the support can be seen from FIG. 3*h*. As shown in FIG. 3*h*, a flexible printed circuit board is laid on the rear side of the support, and a tail end of the support (the tail end of the support refers to an opposite end of an end at which the hole is disposed) slightly exceeds a width of the flexible printed circuit board. This can provide more protection for the flexible printed circuit board.

As shown in FIG. 3*h*, when the cable 42 is fastened to the fastener assembly of the support 53, the cable 42 may be fastened to the fastener assembly in an arc angle. The flexible printed circuit board 41 and the cable 42 are located at two ends of the support 53, and a center of the arc of the cable 42 may face a side away from the flexible printed circuit board 41. In this way, because the cable 42 has a specific angle, after the cable 42 is fastened to the fastener assembly, a bending direction of the cable 42 is fixed. Therefore, in a process of folding the terminal device, a degree of bending freedom of the cable 42 can be reduced, friction between the cable 42 and another component of the third housing 3 (for example, an inner surface or a bearing of the third housing 3) can be reduced, and friction generated by the cable 42 can also be reduced. Further, because the center of the arc of the cable 42 faces the end away from the flexible printed circuit board 41, friction between the cable 42 and the flexible printed circuit board 41 can be reduced in a bending process of the cable 42. In addition, a distance between the fastener assembly of the support 53 and the flexible printed circuit board 41 fastened on the support 53 may be increased. For example, if the distance between the fastener assembly and the flexible printed circuit board 41 on the support 53 is greater than a preset distance, friction between the cable 42 and the flexible printed circuit board 41 in the bending process can be further reduced. Optionally, in this embodiment of this application, the groove 531 and the fastener assembly that are used to fasten the cable 42 are merely two examples. To fasten the cable 42, another structure that can fasten the cable 42 may also be disposed on the support 53.

Figure 3I:
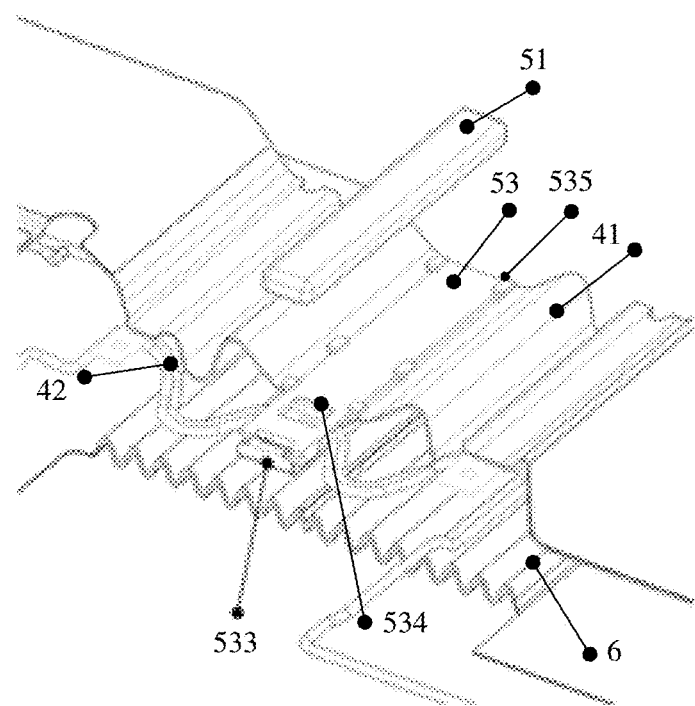
FIG. 3i is a schematic diagram of a structure obtained after a fastener is clamped to a hole.

FIG. 3*i* is a schematic diagram of a structure obtained after the fastener 533 is clamped to the hole 534. As shown in FIG. 3*i*, the cable 42 is placed on the hole 534, and the fastener 533 is clamped to the hole 534, so that the cable 42 is clamped. FIG. 3*i* shows a structural form after the fastener 533 is clamped to the hole 534, and ears on two sides of the fastener 533 may be inserted into the hole 533, so that the fastener 533 is clamped to the hole 534.

Figure 3J:
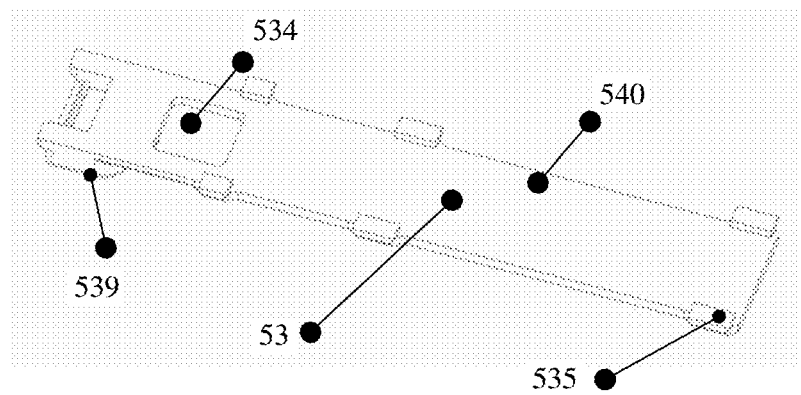
FIG. 3j is a schematic diagram of a structure of a support in FIG. 3g.

FIG. 3*j* is a schematic diagram of a structure of the support 53 in FIG. 3*g*. As shown in FIG. 3*j*, the stop blocks 535 are disposed on the first surface 540 (the first surface 540 is a surface that is relatively close to the first magnetic component) of the support. For related descriptions of the stop blocks 535, refer to the foregoing content. Details are not described herein again.

Figure 3K:
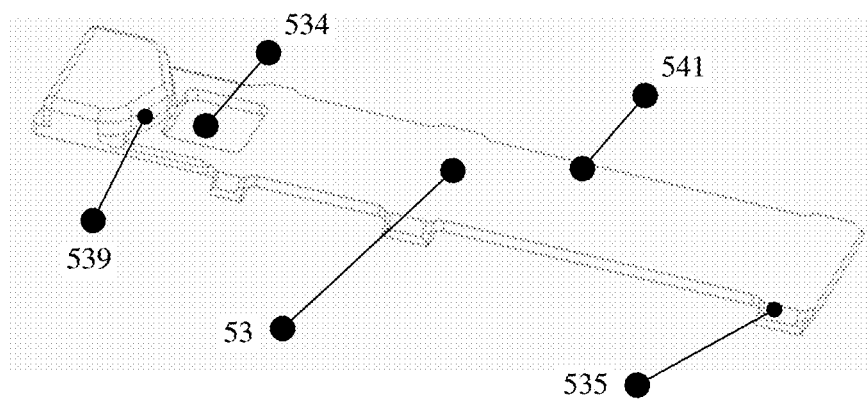
FIG. 3k is a schematic diagram of a structure of a support in a direction C in FIG. 3g.

FIG. 3*k* is a schematic diagram of a structure of the support 53 in a direction C in FIG. 3*g*. A structural form of a second surface 541 of the support can be seen from FIG. 3*k*. As shown in FIG. 3*k*, one end of the support 53 is provided with the hole, and an arc-shaped boss structure 539 may be provided at the end provided with the hole. To maintain an arc shape of the cable in the hole, a center of the arc-shaped boss structure 539 faces one end away from the flexible printed circuit board 41.

Figure 3L:
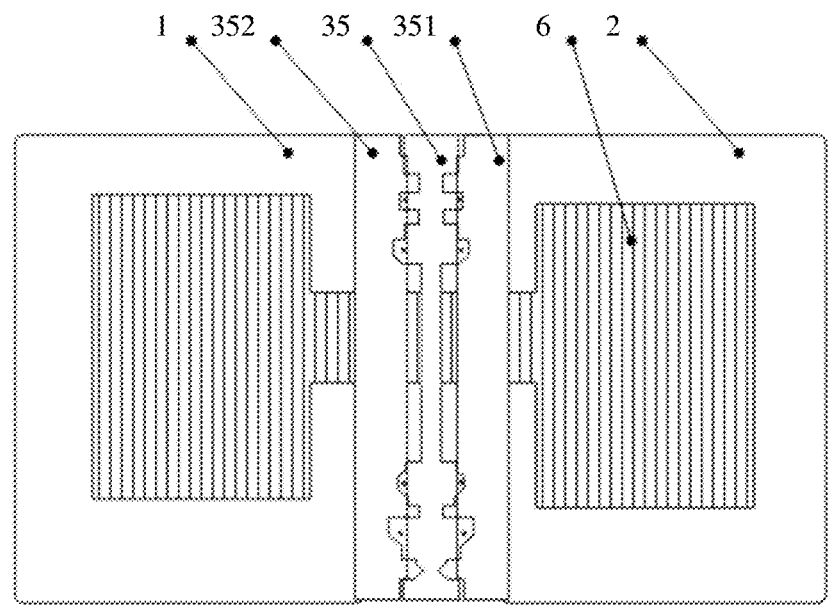

FIG. 3*l* is a schematic diagram of a structure of a screen side in FIG. 2*a*. It can be seen from FIG. 3*l* that, a screen side of the third housing 3 includes the first inner housing 35, the second inner housing 351, and the third inner housing 352. The first inner housing 35 is rotatably connected to the second inner housing 351, and the first inner housing 35 is rotatably connected to the third inner housing 351. The second inner housing 351 and the third inner housing 352 are respectively disposed at both sides of the first inner housing 35. The second inner housing 351 is connected to the first housing 1, and the third inner housing 352 is connected to the second housing 2. There are some gaps between the first inner housing 35 and the third inner housing 352, and there are some gaps between the first inner housing 35 and the second inner housing 351. The buffer component 6 penetrates inside the third housing, and is laid in the first housing 1 and the second housing 2. The screen 12 is further laid on the first inner housing 35, the second inner housing 351, the third inner housing 352, and the buffer component of the third housing.

Figure 3M:
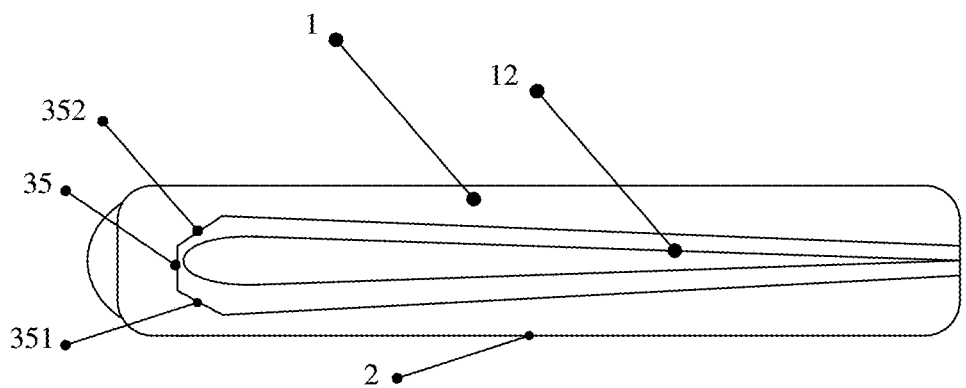
FIG. 3m is a schematic diagram of a structure of a terminal device in FIG. 3l in a folded state.

FIG. 3m is a schematic diagram of a structure of the terminal device in FIG. 3m in a folded state. As shown in FIG. 3m, when the terminal device is in the folded state, the first inner housing 35, the second inner housing 351, and the third inner housing 352 may form relatively large space, to reserve specific space for a folded area of the screen 12, so that the screen 12 can be in a natural state as much as possible.

Figure 3N:
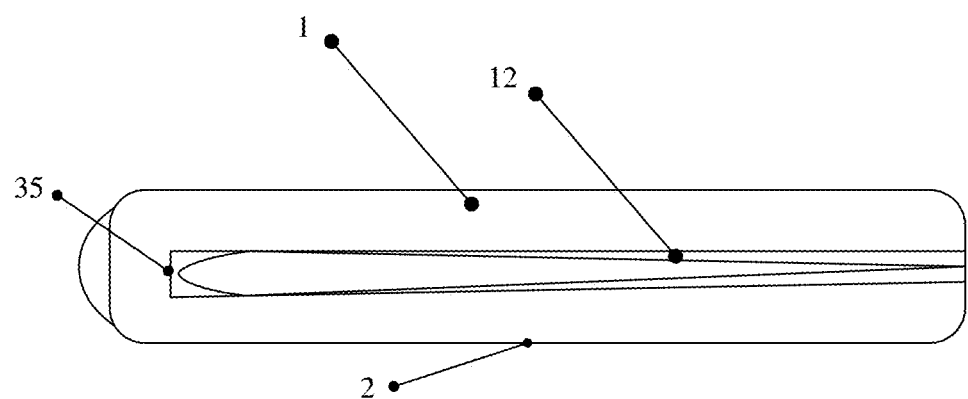
FIG. 3n is a schematic diagram of a structure of another terminal device in a folded state.

FIG. 3n is a schematic diagram of a structure of another terminal device in a folded state. It can be seen from FIG. 3n that, if only one first inner housing 35 is disposed on the third housing, the first inner housing 35 is directly connected to the first housing 1 and the second housing 2, and the second inner housing 351 and the third inner housing 352 are no longer disposed. It can be seen from FIG. 3n that, when the terminal device is in the folded state, space reserved by the first inner housing 35, the first housing 1, and the second housing 2 in the folded area of the screen 12 is relatively small, and the first housing 1 and the second housing 2 are prone to squeeze onto the screen 12. In this solution, a damage rate of the screen 12 is relatively high. In the solutions provided in this embodiment of this application shown in FIG. 3l and FIG. 3m, because the second inner housing 351 and the third inner housing 352 are added, larger space can be provided for a redundancy of the screen 12 of the terminal device in the folded state, so that squeezing and abrasion to the screen 12 can be reduced, and a service life of the screen 12 can be increased.

One end of the wire may be fastened to the first housing 1, and the other end of the wire may be fastened to the second housing 2. When the wire is fastened to the first housing 1 or the second housing 2, the wire may be fastened in a plurality of manners. A manner in which the wire is fastened to the first housing 1 is used as an example. In an optional implementation, as shown in FIG. 3a, when the wire includes the flexible printed circuit board 41, a steel sheet 7 is fastened between the flexible printed circuit board 41 and the first housing 1, foam 8 and a presser 9 are placed on a top surface of the flexible printed circuit board 41 at a time, and the presser 9 is configured to press the flexible printed circuit board 41 tightly. Further, the presser 9, the foam 8, the flexible printed circuit board 41, and the steel sheet 7 may be fastened to the first housing 1 by using screws or the like. Optionally, a double-sided tape may be placed between the steel sheet 7 and the first housing 1, to further fasten the steel sheet 7 and play a buffering role. The foam 8 is configured to reduce abrasion between the wire and the presser 9, and plays a buffering role. Optionally, a positioning hole may be preset on the first housing 1, and is configured to play a positioning role in a process of fastening the flexible printed circuit board 41 to the first housing 1. In other words, the positioning hole is configured to insert a fastening connector such as a screw.

In another optional implementation, when the wire includes the cable 42, the cable 42 may be disposed between the steel sheet 7 and the presser 9, and the cable 42 disposed between the steel sheet 7 and the presser 9 is fastened to the first housing 1. Further, the presser 9, the cable 42, and the steel sheet 7 may be fastened to the first housing 1 by using screws or the like. Optionally, the foam 8 may be disposed between the steel sheet 7 and the cable 42 for buffering. In this embodiment of this application, the foam 8 may alternatively be replaced with another rubber buffer material. Optionally, a double-sided tape may be disposed between the steel sheet 7 and the first housing 1, to further fasten the steel sheet 7 and play a buffering role. The cable groove 531 may also be disposed on the first housing 1, and the cable groove 531 may be optionally disposed in an oblique direction, to match a bending form of the arc-shaped cable 42 fastened to the third housing 3. The cable 42 is fastened in the oblique cable groove 531, and the cable 42 may be glued to the oblique cable groove 531 through glue dispensing. A direction of the cable 42 fastened in the oblique cable groove 531 matches an arc shape of the cable 42 fastened by the support 53, so that the cable 42 is bent more naturally, abrasion of the cable 42 is reduced, and reliability of the cable 42 is further improved. Herein, the first housing 1 is used as an example for description. When the flexible printed circuit board 41 is fastened to the second housing 2, the process is similar. Details are not described again. In this embodiment, the wire is also fastened on the first housing 1 and the second housing 2, that is, on both sides of the third housing 3. Therefore, the degree of freedom of the wire may be further limited, a movement form of the wire may be further limited, and abrasion between the wire and the third housing 3 is further reduced.

In this embodiment of this application, the wire may include one or more cables. In an optional implementation, one or more grooves may be disposed on the support, and a plurality of cables may be placed into one groove, or a plurality of cables may be placed into a plurality of grooves. For example, one or more cables may be placed into one groove. In another optional implementation, one or more fastener assemblies may be disposed on the support. A plurality of cables are fastened by using the one or more fastener assemblies, and one fastener assembly may fasten one or more cables.

In this embodiment of this application, the flexible printed circuit board included in the wire may be a single-layer flexible printed circuit board, or may include a multilayer flexible printed circuit board. That is, one or more layers of flexible printed circuit boards 41 may be included between the support 53 and the second magnetic component 54. When the wire includes a single-layer flexible printed circuit board 41, the flexible printed circuit board is disposed between the support and the second magnetic component. Because the flexible printed circuit board 41 is clamped between the support 53 and the second magnetic component 54 under an effect of a magnetic adsorption force between the second magnetic component 54 and the first magnetic component 51, the flexible printed circuit board 41 may be in movable contact with the support 53. In this way, in the process of folding and expanding the terminal device, relative movement may exist between the flexible printed circuit board and the support. In this way, if there is an assembly tolerance, the structural form more easily absorbs the tolerance, so that lengths of the flexible printed circuit boards 41 on the left and right sides of the wire fastening assembly 5 can be more optimized.

Optionally, the flexible printed circuit board 41 is in movable contact with the second magnetic component 54. In this way, in the process of folding and expanding the terminal device, relative movement may exist between the flexible printed circuit board and the second magnetic component. In this way, if there is an assembly tolerance, the structural form more easily absorbs the tolerance, so that lengths of the flexible printed circuit boards 41 on the left and right sides of the wire fastening assembly 5 can be more optimized.

In still another possible implementation, in this embodiment of this application, the flexible printed circuit board included in the wire may be a single-layer flexible printed circuit board, or may include a multilayer flexible printed circuit board. That is, one or more layers of flexible printed circuit boards 41 may be included between the support 53 and the second magnetic component 54. When the wire includes a single-layer flexible printed circuit board 41, the flexible printed circuit board is disposed between the support and the second magnetic component. Because the flexible printed circuit board 41 is clamped between the support 53 and the second magnetic component 54 under an effect of a magnetic adsorption force between the second magnetic component 54 and the first magnetic component 51, the flexible printed circuit board 41 may be connected to the support 53 by using, for example, an adhesive or a double-sided tape. In this way, in the process of folding and expanding the terminal device, the flexible printed circuit board and the support, and the flexible printed circuit board and the second magnetic component are adhered to each other by using the adhesive, and therefore are relatively evenly distributed on two sides.

Optionally, the flexible printed circuit board 41 is connected to the second magnetic component 54 by using, for example, the adhesive or the double-sided tape. In this way, in the process of folding and expanding the terminal device, the flexible printed circuit board and the support, and the flexible printed circuit board and the second magnetic component are adhered to each other by using the adhesive, and therefore are relatively evenly distributed on two sides.

In another optional implementation, when the wire includes the multilayer flexible printed circuit board 41, because the multilayer flexible printed circuit board 41 is clamped between the support 53 and the second magnetic component 54 under an effect of a magnetic adsorption force between the second magnetic component 54 and the first magnetic component 51, any two layers of the multilayer flexible printed circuit board 41 may be in movable contact. In other words, there may be relative displacement between any two layers of the flexible printed circuit board 41, and relative movement may exist in the process of folding and expanding the terminal device. When the multilayer flexible printed circuit boards 41 are fixedly connected by using the adhesive, the multilayer flexible printed circuit boards 41 that are bonded are relatively hard and thick. In this case, the multilayer flexible printed circuit boards 41 are prone to be broken and fail. However, in this embodiment of this application, the multilayer flexible printed circuit boards 41 are in movable contact with each other and do not need to be bonded by using the adhesive. In this way, a failure of the flexible printed circuit board 41 caused by the adhesive can be avoided, and reliability of the flexible printed circuit board 41 can be improved.

Optionally, the second magnetic component 54 and the flexible printed circuit board 41 that is in contact with the second magnetic component 54 may be in movable contact, and may have relative displacement. Relative movement may exist in the process of folding and expanding the terminal device. In this way, the flexible printed circuit board 41 can slide in the process of folding and expanding the terminal device. Therefore, if there is an assembly tolerance, the tolerance can be more easily absorbed, so that lengths of the flexible printed circuit boards 41 on the left and right sides of the wire fastening assembly 5 can be more optimized.

In another optional implementation, when the wire includes the multilayer flexible printed circuit board 41, optionally, the second magnetic component 54 may be connected, by using, for example, an adhesive, to the flexible printed circuit board 41 that is in contact with the second magnetic component 54. In this way, quantities on two sides of the flexible printed circuit board can be kept relatively even.

Optionally, the support 53 and the flexible printed circuit board 41 that is in contact with the support 53 may be in movable contact, and may have relative displacement. Relative movement may exist in the process of folding and expanding the terminal device. In this way, the flexible printed circuit board 41 can slide in the process of folding and expanding the terminal device. Therefore, if there is an assembly tolerance, the tolerance can be more easily absorbed, so that lengths of the flexible printed circuit boards 41 on the left and right sides of the wire fastening assembly 5 can be more optimized.

Optionally, the support 53 and the flexible printed circuit board 41 that is in contact with the support 53 may be connected by using, for example, the adhesive. In this way, quantities on two sides of the flexible printed circuit board can be kept relatively even.

Figure 4A:
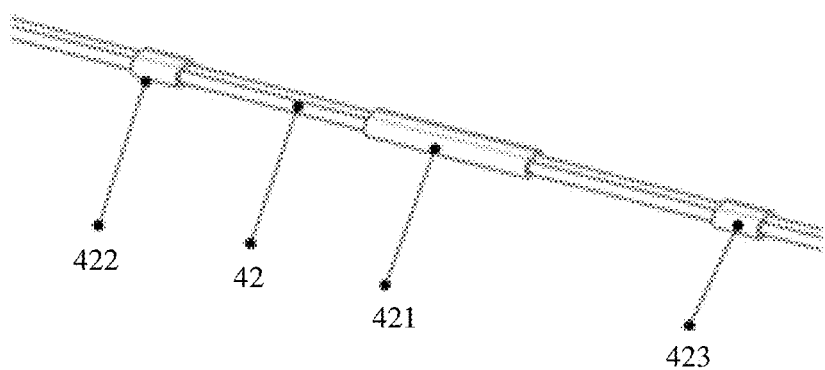
FIG. 4a is a schematic diagram of a structure of a cable 42.
Figure 4B:
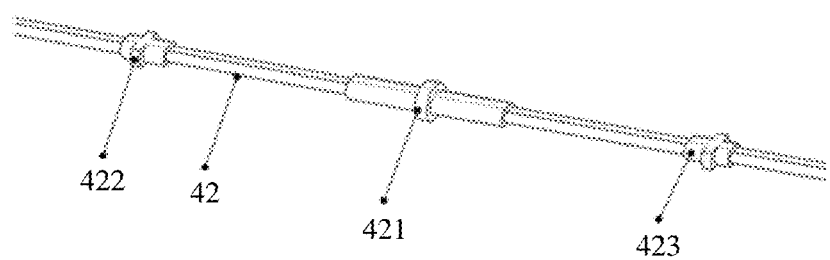
FIG. 4b is a schematic diagram of a structure of another cable 42.

FIG. 4*a* shows an example of a schematic diagram of a structure of a cable 42, and FIG. 4*b* shows an example of a schematic diagram of a structure of another cable 42. It can be seen from FIG. 4*a* and FIG. 4*b* that, the cable 42 includes a first positioning area 421, a second positioning area 422, and a third positioning area 423. The first positioning area 421 refers to an area in which the cable 42 is connected to the third housing 3, the second positioning area 422 refers to an area in which the cable 42 is fixedly connected to the first housing 1, and the third positioning area 423 refers to an area in which the cable 42 is fixedly connected to the second housing 2. The cable 42 in the first positioning area 421, the second positioning area 422, and the third positioning area 423 may be thickened, to reduce a failure possibility of the cable 42 and improve reliability of the cable 42.

In an optional implementation, a surface of the cable 42 in one or more of the first positioning area 421, the second positioning area 422, and the third positioning area 423 of the cable 42 may be wrapped with an acetate cloth tape or soft cloth, to thicken the cable 42, as shown in FIG. 4*a*, so as to improve reliability of the cable 42.

In another optional implementation, the cable 42 may be manufactured by using a rubber (rubber) in-mold decoration technology. The cable 42 in one or more of the first positioning area 421, the second positioning area 422, and the third positioning area 423 of the cable 42 are thickened, as shown in FIG. 4*b*. Further, optionally, a positioning structure may be disposed on the cable 42 in one or more of the first positioning area 421, the second positioning area 422, and the third positioning area 423 by thickening the cable 42. As shown in FIG. 4*b*, the cable 42 with a largest diameter in the first positioning area 421 belongs to the positioning structure of the first positioning area 421, and during assembly, the cable 42 with the largest diameter in the first positioning area 421 may be connected to the wire fastening assembly 5. For another example, as shown in FIG. 4*b*, a cross structure of the second positioning area 422 may be fixedly connected to the first housing 1 at the cross structure of the second positioning area 422 during positioning. For another example, as shown in FIG. 4*b*, a cross structure of the third positioning area 423 may be fixedly connected to the second housing 2 at the cross structure of the third positioning area 423 during positioning. In this way, the cable 42 can be more accurately positioned to the support 53, the first housing 1, and the second housing 2. In addition, when the cable 42 is clamped through the groove 531 of the support 53, the first positioning area 421 of the cable 42 is thickened, so that the cable 42 is clamped more tightly in the groove 531. Further, in another optional implementation, the cable 42 may also be glued to the support 53 through glue dispensing. For example, the cable 42 may be fastened in the groove 531 of the support 53 through glue dispensing. After the cable 42 in one or more of the first positioning area 421, the second positioning area 422, and the third positioning area 423 of the cable 42 is thickened in FIG. 4*a* and FIG. 4*b*, a service life of the cable 42 can be increased, reliability of the cable 42 can be increased, and a bending life of the cable 42 may reach more than 200,000 times.

Figure 4C:
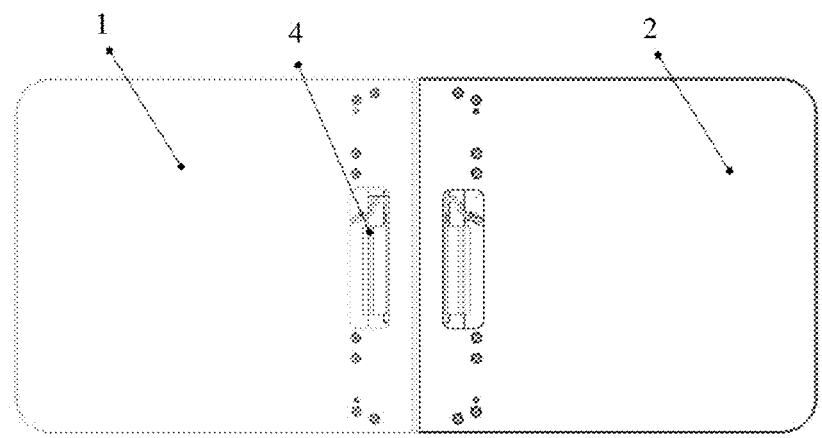
FIG. 4c is a schematic diagram of a structure of a terminal device according to an embodiment of this application.

FIG. 4*c* shows an example of a schematic diagram of a structure of a terminal device. In FIG. 4*c*, the first housing 1 in an area E is removed, so that a structure of the third housing 3 corresponding to the area E can be seen. In FIG. 4*c*, the second housing 2 in an area F is removed, so that a structure of the third housing 3 corresponding to the area F can be seen. It can be seen from the area E and the area F that the third housing 3 includes the first opening 31 area and the second opening 32 area, and the flexible printed circuit board 41 and the cable 42 penetrate into the third housing 3 from the first opening 31 area and penetrate out from the second opening 32 area.

Based on the foregoing content, an embodiment of this application provides an optional method for assembling the terminal device. In a first assembly method, the third housing 3 may be first assembled with the first housing 1, and the third housing 3 is assembled with the second housing 2. Then, the buffer component 6 penetrates into the interior of the third housing 3 through the first opening 31 and the second opening 32, and the buffer component 6 is fastened to the first housing 1 and the second housing 2. Then, the cable is connected to the magnetic assembly, and the magnetic assembly connected to the cable penetrates into the third housing 3 through the first opening 31, so that the magnetic assembly is automatically adsorbed on the first magnetic component 51 inside the third housing 3 (the first magnetic component 51 is pre-installed on the third housing 3). The cable is penetrated out from the second opening 32, and the cable is fastened to the first housing 1 and the second housing 2.

In a second assembly method, the outer housing of the third housing 3 may be first assembled with the first housing 1, and the outer housing of the third housing 3 is assembled with the second housing 2. The buffer component 6 is fastened to the first housing 1 and the second housing 2. Then, the cable is connected to the magnetic assembly, and the magnetic assembly connected to the cable penetrates into the third housing 3 through the first opening 31, so that the magnetic assembly is automatically adsorbed on the first magnetic component 51 inside the third housing 3 (the first magnetic component 51 is pre-installed on the third housing 3). The cable is penetrated out from the second opening 32. Then, the buffer component 6 covers the interior of the third housing 3, and is fastened to the first housing 1 and the second housing 2. Finally, the first inner housing 35 of the third housing 3 is assembled. Then, the cable is fastened to the first housing 1, and the cable is fastened to the second housing 2.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A terminal device, comprising:
 a first housing;
 a second housing;
 a third housing, wherein a first plurality of rotating shafts are disposed at a first end of the third housing, and a second plurality of rotating shafts are disposed at a second end of the third housing that is opposite to the first end of the third housing, a first side of the third housing is connected to the first housing through the first plurality of rotating shafts and the second plurality of rotating shafts, a second side of the third housing is connected to the second housing through the first plurality of rotating shafts and the second plurality of rotating shafts, the first side of the third housing is opposite to the second side of the third housing, the third housing is a semi-closed housing, opening areas are respectively disposed on two sides of the third housing, and wherein each of the opening areas has an elongated shape where a length is greater than a width, and is defined by rounded corners, wherein the length direction of each opening area is parallel to the major axes of the rotating shafts of the first plurality of rotating shafts and the second plurality of rotating shafts;
 a first magnet, wherein the first magnet is fixed in the third housing; and
 a wire penetrating through an interior of the third housing through the opening areas of the third housing, wherein ends of the wire are respectively connected to the first housing and the second housing, and wherein a fastener is fixedly connected to the wire; and
 wherein the fastener is magnetically connected to the first magnet and fastens the wire in the third housing;
 wherein the fastener comprises a second magnet, the second magnet is connected to the first magnet, and the wire is disposed between the first magnet and the second magnet;
 wherein the terminal device further comprises a support, and the support is disposed between the second magnet and the first magnet;
 wherein the wire comprises a flexible printed circuit board, and the flexible printed circuit board is disposed between the support and the second magnet;
 wherein the flexible printed circuit board is in contact with or connected to the support; and
 wherein the flexible printed circuit board is in contact with or connected to the second magnet.

2. The terminal device according to claim 1, wherein the wire comprises multiple flexible printed circuit boards, the multiple flexible printed circuit boards are disposed between the support and the second magnet, and the multiple flexible printed circuit boards satisfy one or more of the following:
 at least two adjacent layers in the multiple flexible printed circuit boards are in contact with each other;
 at least one of the multiple flexible printed circuit boards is in contact with the support; and
 at least one of the multiple flexible printed circuit boards is in contact with the second magnet.

3. The terminal device according to claim 1, wherein stop blocks are disposed on a surface of the support that faces the first magnet, and the stop blocks are disposed at a plurality of sides of the first magnet.

4. The terminal device according to claim 1, further comprising:
a buffer penetrating between the fastener and the third housing; and
wherein the terminal device is configured in a manner that, when the terminal device is in an expanded state, the buffer presents a multidimensional wave shape.

5. The terminal device according to claim 4, wherein the buffer is made of a heat conducting material.

6. The terminal device according to claim 5, wherein the heat conducting material comprises graphite.

7. The terminal device according to claim 1, wherein a difference between a line length between the fastener and the first housing and a line length between the fastener and the second housing is within a preset range.

8. The terminal device according to claim 1, wherein:
an upper surface of the third housing comprises a first inner housing, a second inner housing, and a third inner housing, and the upper surface of the third housing comprises a surface on which a screen of the terminal device is disposed;
the second inner housing and the third inner housing are located at a plurality of sides of the first inner housing;
a first side of the second inner housing is rotatably connected to the first inner housing, and a second side is connected to the first housing; and
a first side of the third inner housing is rotatably connected to the first inner housing, and a second side is connected to the second housing.

9. A foldable terminal device, comprising:
a first housing;
a second housing;
a third housing;
a fastener;
wherein a first plurality of rotating shafts are disposed at a first end of the third housing, and a second plurality of rotating shafts are disposed at a second end of the third housing that is opposite to the first end of the third housing, a first side of the third housing is connected to the first housing through the first plurality of rotating shafts and the second plurality of rotating shafts, a second side of the third housing is connected to the second housing through the first plurality of rotating shafts and the second plurality of rotating shafts, the first side of the third housing is opposite to the second side of the third housing, the third housing is a semi-closed housing, one or more opening areas are disposed on a side surface of the third housing, a first side or a plurality of sides of the one or more opening areas is defined by one or more rounded corners, a diameter of the one or more rounded corners is greater than a preset diameter;
a first magnet, wherein the first magnet is fixed in third housing; wherein an upper surface of the third housing comprises a first inner housing, a second inner housing, and a third inner housing, and the upper surface of the third housing comprises a surface on which a screen of the terminal device is disposed, wherein the second inner housing and the third inner housing are located at a plurality of sides of the first inner housing, a first side of the second inner housing is rotatably connected to the first inner housing, and a second side of the second inner housing is connected to the first housing, and a first side of the third inner housing is rotatably connected to the first inner housing, and a second side of the third inner housing is connected to the second housing;
wherein a wire comprises a cable and a multilayer flexible printed circuit board, wherein the wire penetrates through an interior of the third housing through the opening area of the third housing, ends of the wire are respectively connected to the first housing and the second housing, a diameter of an area that is on the cable and connected to the third housing, the first housing, and the second housing is greater than a preset diameter, and a positioning structure is disposed in the area that is on the cable and connected to the third housing, the first housing, and the second housing;
wherein a difference between a line length between the fastener and the first housing and a line length between the fastener and the second housing is within a preset range, the fastener comprises the first magnet, a second magnet, and a support, the first magnet is fixedly connected to the interior of the third housing, the second magnet is magnetically connected to the first magnet, the support is disposed between the second magnet and the first magnet, stop blocks are disposed on a surface of the support that faces the first magnet, and the stop blocks are disposed at a plurality of sides of the first magnet;
wherein the multilayer flexible printed circuit board is disposed at a first end of the support, a multilayer cable is disposed at a second end of the support, a distance between a first contact area on the support and a second contact area on the support is greater than a preset distance, the first contact area comprises a contact area between the multilayer flexible printed circuit board and the support, and the second contact area comprises a contact area between the cable and the support; and
wherein the multilayer flexible printed circuit board is disposed between the support and the second magnet, at least two adjacent layers of flexible printed circuit boards in the multilayer flexible printed circuit board are in contact with each other, at least one flexible printed circuit board in the multilayer flexible printed circuit board is in contact with the support, and at least one flexible printed circuit board in the multilayer flexible printed circuit board is in contact with the second magnet; and
a buffer, wherein the buffer penetrates between the first magnet and the third housing, and wherein the terminal device is configured in a manner that, when the terminal device is in an expanded state, the buffer presents a multidimensional wave shape.

* * * * *

UNITED STATES PATENT AND TRADEMARK OFFICE
CERTIFICATE OF CORRECTION

PATENT NO. : 12,314,082 B2
APPLICATION NO. : 17/804458
DATED : May 27, 2025
INVENTOR(S) : Luo et al.

Page 1 of 1

It is certified that error appears in the above-identified patent and that said Letters Patent is hereby corrected as shown below:

In the Claims

In Column 24, in Claim 1, Line 40, after "wire;" delete "and".

Signed and Sealed this
Twenty-fourth Day of June, 2025

Coke Morgan Stewart
*Acting Director of the United States Patent and Trademark Office*